US012562803B2

(12) United States Patent
Schreck et al.

(10) Patent No.: US 12,562,803 B2
(45) Date of Patent: Feb. 24, 2026

(54) METHODS AND DEVICES FOR BEAM MANAGEMENT OPERATION

(71) Applicant: Intel Corporation, Santa Clara, CA (US)

(72) Inventors: Jan Schreck, Scotts Valley, CA (US); Yang-Seok Choi, Portland, OR (US); Nageen Himayat, Danville, CA (US); Di Liu, Beijing (CN); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/572,805

(22) PCT Filed: Dec. 23, 2021

(86) PCT No.: PCT/CN2021/140695
§ 371 (c)(1),
(2) Date: Dec. 21, 2023

(87) PCT Pub. No.: WO2023/115437
PCT Pub. Date: Jun. 29, 2023

(65) Prior Publication Data
US 2024/0372600 A1 Nov. 7, 2024

(51) Int. Cl.
*H04B 7/06* (2006.01)
*H04B 7/0456* (2017.01)
(52) U.S. Cl.
CPC ....... *H04B 7/06952* (2023.05); *H04B 7/0481* (2023.05); *H04B 7/0617* (2013.01)
(58) Field of Classification Search
CPC .......................... H04B 7/06952; H04B 7/0617
See application file for complete search history.

(56) References Cited

U.S. PATENT DOCUMENTS

| | | | | |
|---|---|---|---|---|
| 2019/0372644 A1* | 12/2019 | Chen | ...................... | H04W 24/02 |
| 2020/0259545 A1* | 8/2020 | Bai | ..................... | H04W 72/046 |

(Continued)

FOREIGN PATENT DOCUMENTS

| | | |
|---|---|---|
| CN | 111954228 A | 11/2020 |
| CN | 112136334 A | 12/2020 |

OTHER PUBLICATIONS

Asustek; "Beam management in NR"; 3rd Generation Partnership Project Technical Specification Group Radio Access Network; 3GPP TSG-RAN WG2 Meeting #96 R2-168207; retrieved from https://www.3gpp.org/dynareport?code=TDocExMtg--R2-96--31671.htm on Nov. 3, 2023; dated Nov. 2016; 5 pages.

(Continued)

*Primary Examiner* — Jaison Joseph
(74) *Attorney, Agent, or Firm* — Viering, Jentschura & Partner mbB

(57) ABSTRACT

Devices and methods for performing a beam management operation are provided in this disclosure. A radio communication device may include a transceiver that is configured to transmit a plurality of reference signals, each reference signal being beamformed based on a set of beamforming weights that is different from a set of beamforming weights of at least one other reference signal, and receive a plurality of measurement results representing measurements for at least some of the plurality of reference signals. The radio communication device may further include a processor that is configured to provide the plurality of measurement results to a machine learning model configured to determine a parameter for a beam management operation using a predefined codebook and perform the beam management operation according to the predefined codebook based on the determined parameter.

17 Claims, 17 Drawing Sheets

(56) References Cited

U.S. PATENT DOCUMENTS

| | | | | |
|---|---|---|---|---|
| 2020/0366340 A1* | 11/2020 | Zhang | ................. | H04B 17/318 |
| 2022/0255600 A1* | 8/2022 | Raghavan | ............. | H04L 5/0048 |
| 2022/0286249 A1* | 9/2022 | Liu | ....................... | H04L 5/0051 |
| 2023/0033336 A1* | 2/2023 | Awoniyi-Oteri | ....... | H04B 7/063 |
| 2023/0057661 A1* | 2/2023 | Awoniyi-Oteri | ...... | H04W 24/08 |
| 2023/0103220 A1* | 3/2023 | Pezeshki | ................. | H04B 7/08 |
| | | | | 370/329 |
| 2024/0372600 A1* | 11/2024 | Schreck | .............. | H04B 7/0456 |
| 2025/0007579 A1* | 1/2025 | Alkhateeb | ........... | H04B 7/0617 |

OTHER PUBLICATIONS

International Search Report for corresponding International Application No. PCT/CN2021/140695, dated Sep. 7, 2022, 3 pages (for informational purposes only).

* cited by examiner

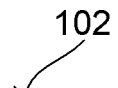
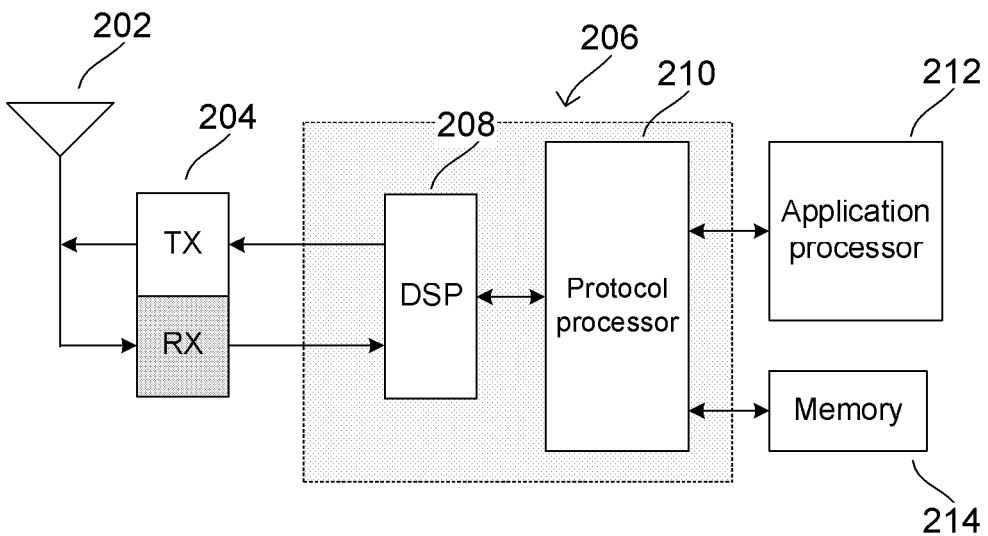
FIG. 2

| MS#1 | 901 |
| MS#2 | |
| MS#3 | |
| MS#4 | |
| MS#5 | |
| MS#6 | |
| MS#7 | |
| MS#8 | |

AI/ML      902

BF Management Parameter      903

Execution
1001

Training
1002

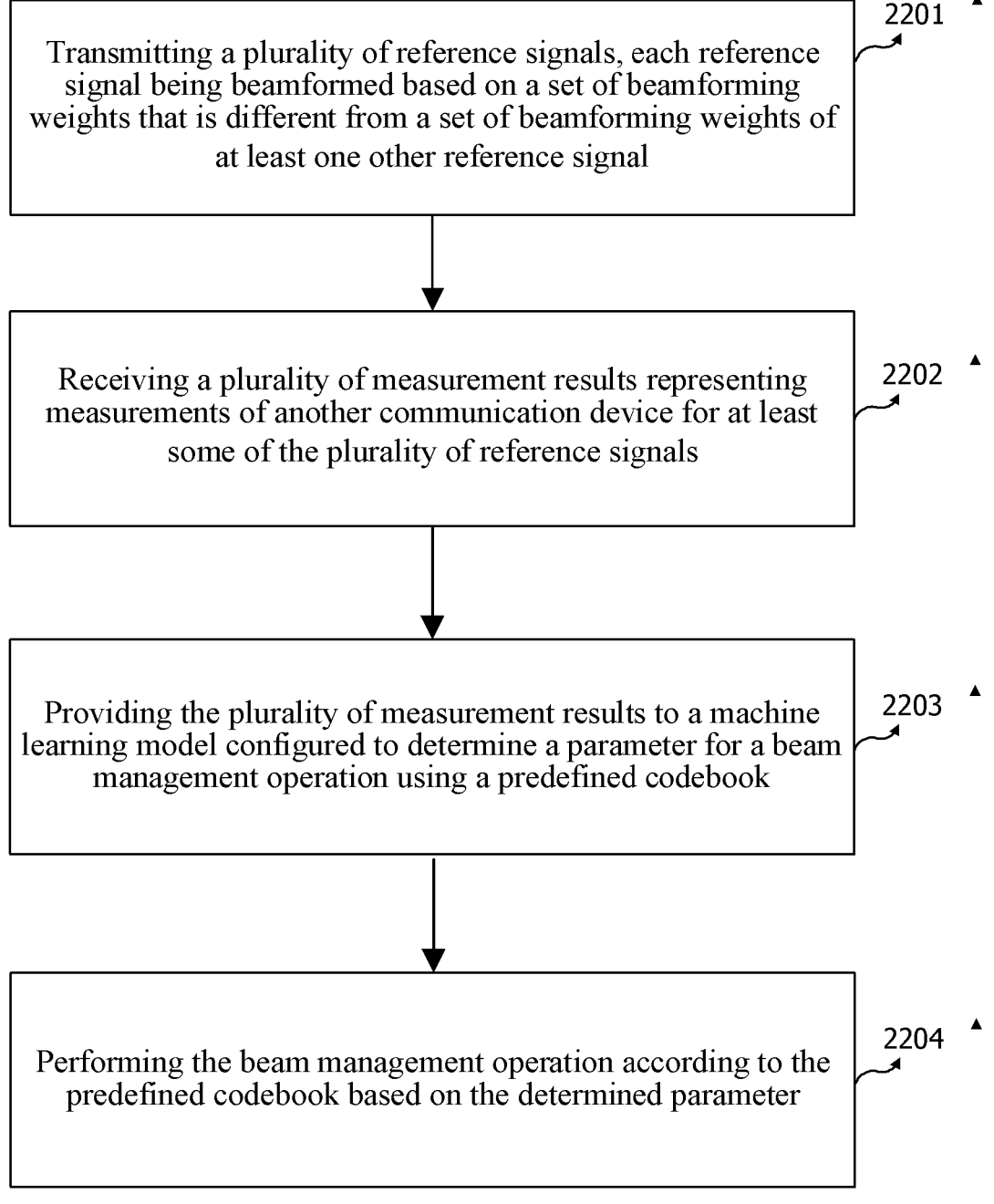

2201

Transmitting a plurality of reference signals, each reference signal being beamformed based on a set of beamforming weights that is different from a set of beamforming weights of at least one other reference signal

2202

Receiving a plurality of measurement results representing measurements of another communication device for at least some of the plurality of reference signals

2203

Providing the plurality of measurement results to a machine learning model configured to determine a parameter for a beam management operation using a predefined codebook

2204

Performing the beam management operation according to the predefined codebook based on the determined parameter

FIG. 22

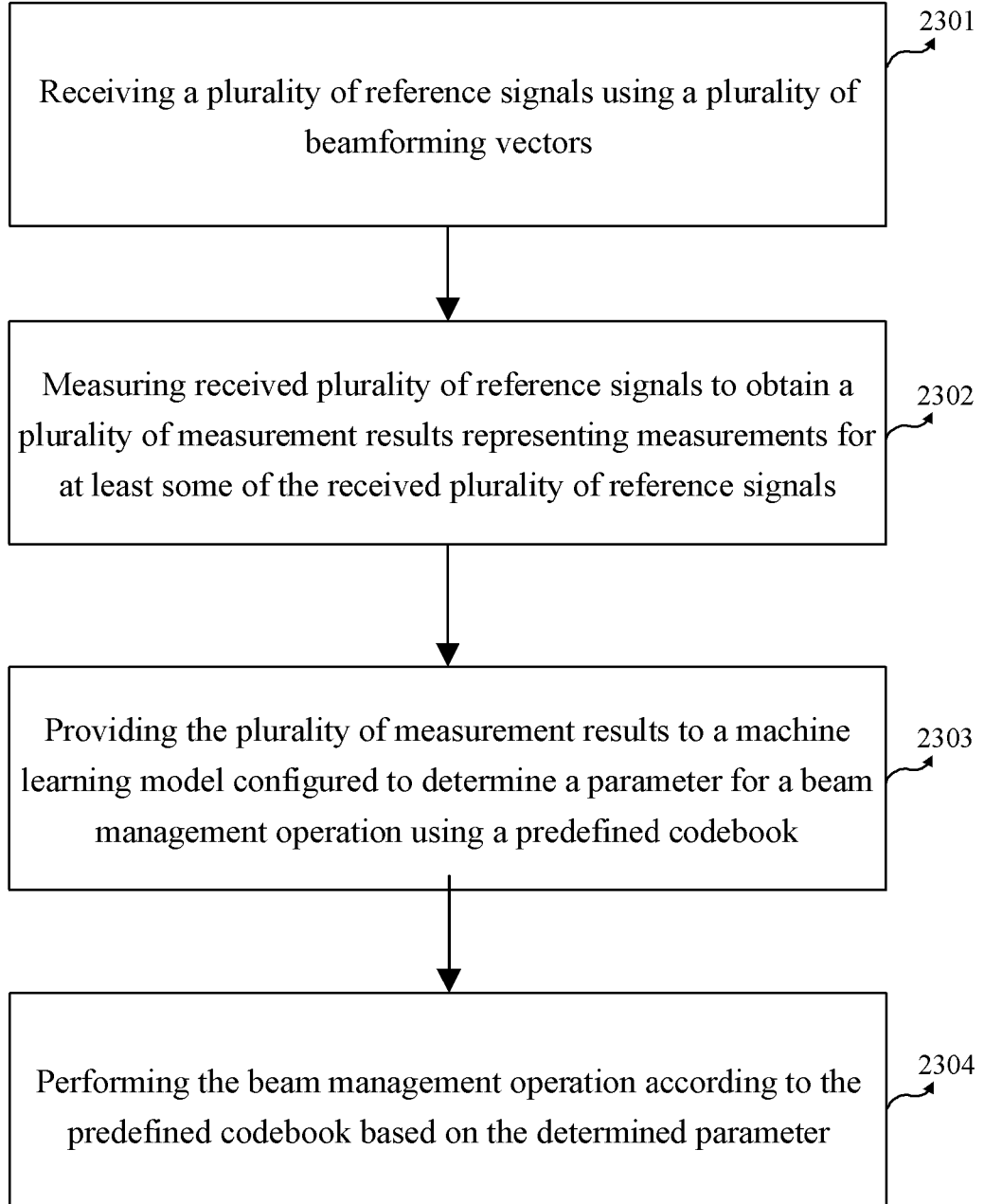

Receiving a plurality of reference signals using a plurality of beamforming vectors

2301

Measuring received plurality of reference signals to obtain a plurality of measurement results representing measurements for at least some of the received plurality of reference signals

2302

Providing the plurality of measurement results to a machine learning model configured to determine a parameter for a beam management operation using a predefined codebook

2303

Performing the beam management operation according to the predefined codebook based on the determined parameter

METHODS AND DEVICES FOR BEAM MANAGEMENT OPERATION

CROSS-REFERENCE TO RELATED APPLICATION(S)

This application is a national phase of PCT Application No. PCT/CN2021/140695 filed on Dec. 23, 2021, the contents of which are fully incorporated herein by reference.

TECHNICAL FIELD

This disclosure generally relates to methods and devices for a beam management operation.

BACKGROUND

Radio access technologies such as Fifth Generation (5G) New Radio (NR) are configured to operate using radio communication signals having high-frequency carrier signals which are susceptible to higher propagation losses. In order to compensate for the propagation losses, directional communication with radio communication signals is desirable. Accordingly, beamforming techniques are employed in order to transmit and/or receive directional radio communication signals. Radio communication devices can use beamforming techniques in both transmit and receive directions, and in order to provide the alignment of beams with the respective devices, beam management operations are desirable to achieve the desired performance of the radio communication. There are various methods used to provide beam management operations for receiving radio communication devices and transmitting radio communication devices.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 2 shows an exemplary internal configuration of a terminal device;

FIG. 22 exemplarily shows an example of a method;

FIG. 23 exemplarily shows an example of a method;

DESCRIPTION

Figure 1:
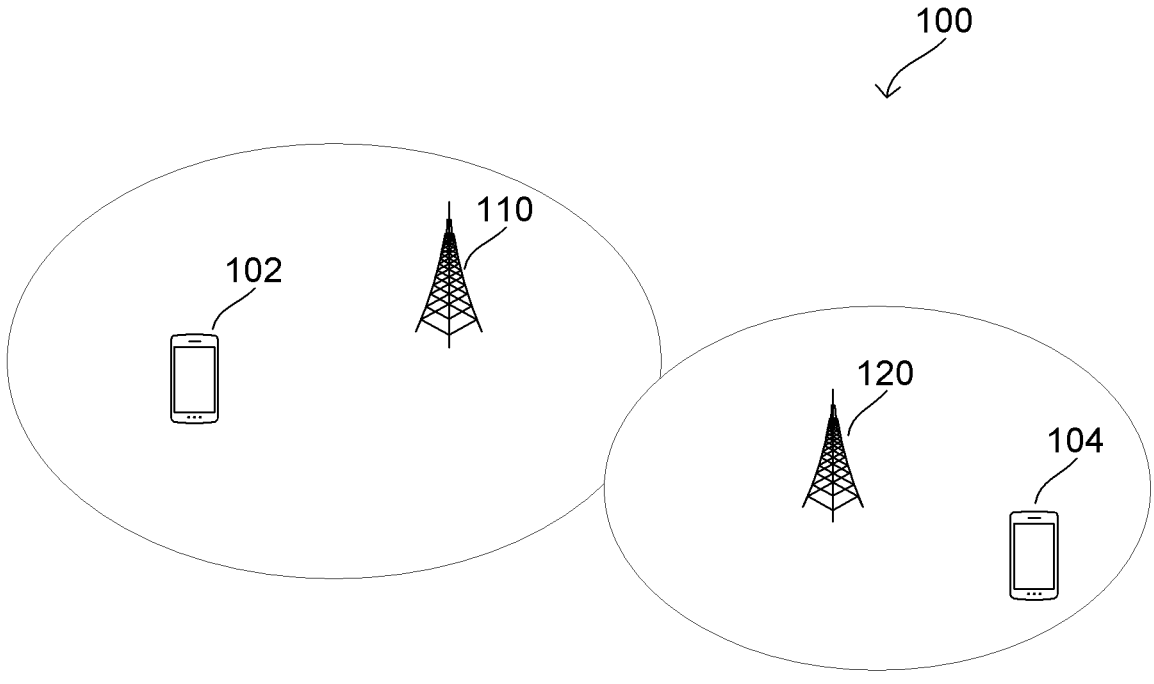
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHZ and further frequencies), and may use various spectrum bands including, but not limited to, IMT (International Mobile Telecommunications) spectrum (including 450-470 MHz, 790-960 MHz, 1710-2025 MHz, 2110-2200 MHZ, 2300-2400 MHZ, 2500-2690 MHz, 698-790 MHz, 610-790 MHZ, 3400-3600 MHZ, etc., where some bands may be limited to specific region(s) and/or countries), IMT-advanced spectrum, IMT-2020 spectrum (expected to include 3600-3800 MHZ, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHZ, 37-38.6 GHz, 38.6-40 GHz, 42-42.5 GHZ, 57-64 GHZ, 64-71 GHz, 71-76 GHz, 81-86 GHz and 92-94 GHz, etc.), the ITS (Intelligent Transport Systems) band of 5.9 GHZ (typically 5.85-5.925 GHZ) and 63-64 GHZ, bands currently allocated to WiGig such as WiGig Band 1 (57.24-59.40 GHZ), WiGig Band 2 (59.40-61.56 GHz) and WiGig Band 3 (61.56-63.72 GHZ) and WiGig Band 4 (63.72-65.88 GHZ), the 70.2 GHZ-71 GHz band, any band between 65.88

GHz and 71 GHz, bands currently allocated to automotive radar applications such as 76-81 GHZ, and future bands including 94-300 GHz and above. Furthermore, the apparatuses and methods described herein can also employ radio communication technologies on a secondary basis on bands such as the TV White Space bands (typically below 790 MHZ) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers.

The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

An antenna port may be understood as a logical concept representing a specific channel or associated with a specific channel. An antenna port may be understood as a logical structure associated with a respective channel (e.g., a respective channel between a user equipment and a base station). Illustratively, symbols (e.g., OFDM symbols) transmitted over an antenna port (e.g., over a first channel) may be subject to different propagation conditions with respect to other symbols transmitted over another antenna port (e.g., over a second channel).

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/Wifi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAS), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Many emerging communication technologies use beamforming techniques to improve communication performance. These beamforming techniques may operate by adjusting the phase of antennas in an array to produce radiation patterns of constructive and destructive interference. By shaping and steering these radiation patterns, radio communication devices can achieve high beamforming gains, which can in turn improve radio communication reliability and performance. This can be particularly beneficial in radio communication technologies that operate at high frequencies, such as millimeter wave (mmWave) technologies. Because these radio technologies may operate at carrier frequencies of 30 GHz and above, beamforming gains can be extremely helpful in compensating for the high pathloss often experienced at carrier frequencies in these ranges.

Figure 3A:
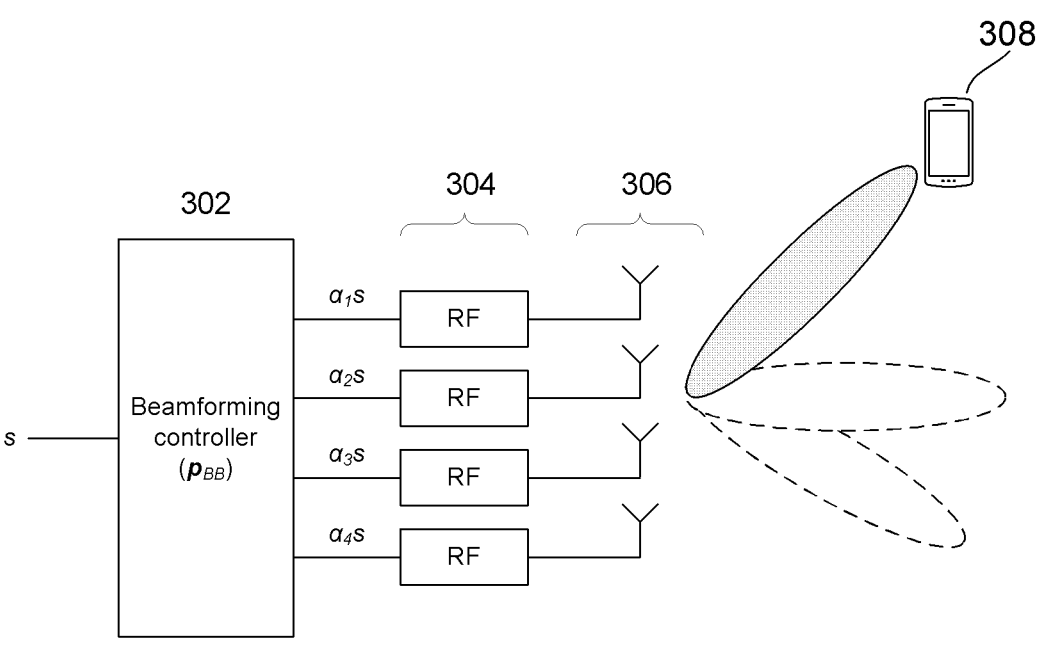
FIG. 3A exemplarily illustrates a simplified digital baseband beamforming architecture.
Figure 3B:
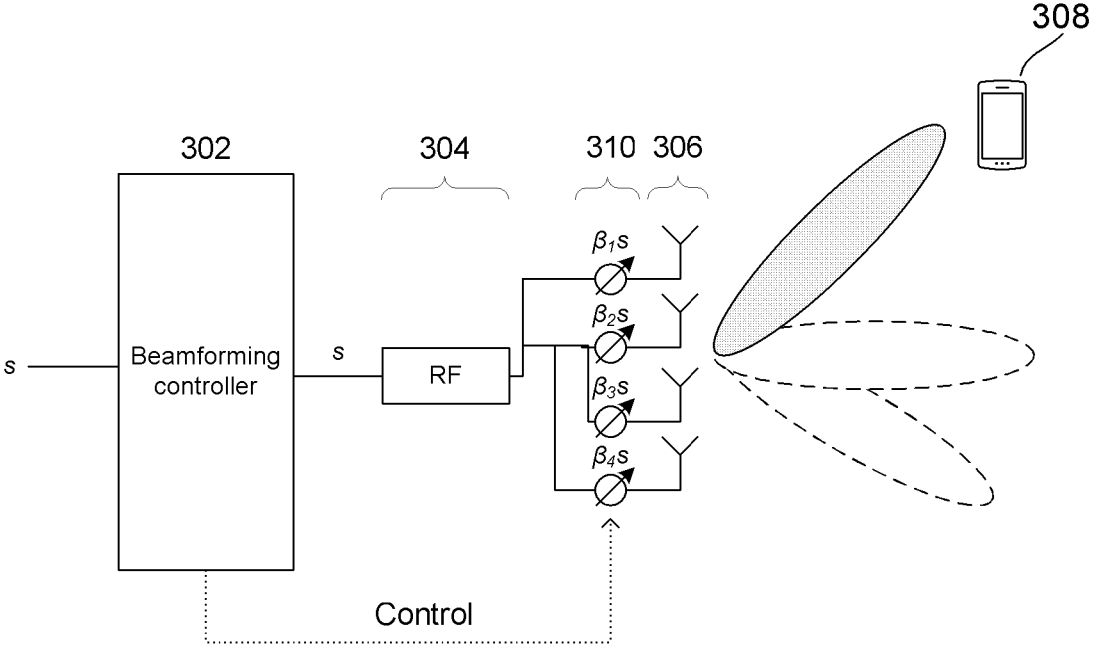
FIG. 3B exemplarily shows an RF beamforming approach.

Beamforming systems may perform processing in one or both of the baseband and RF domains to shape antenna array beam patterns. FIGS. 3A and 3B show two simplified beamforming approaches as deployed for an exemplary four-element antenna array. Although the following description may focus on a beamforming in the transmit direction, skilled persons can also apply analogous beamforming techniques to achieve beamforming gains in the receive direction.

FIG. 3A illustrates a simplified digital baseband beamforming architecture that digitally applies complex beamforming weights (composed of both a gain and phase factor) in the baseband domain. As shown in FIG. 3A, beamforming controller 302 may receive baseband symbol s and subsequently apply a complex weight vector $p_{BB}=[\alpha_1\ \alpha_2\ \alpha_3\ \alpha_4]^T$ to s to generate $p_{BB}$s, where each element $\alpha_i$, i=1, 2, 3, 4 is a complex weight (comprising a gain factor and phase shift). Each resulting element $[\alpha_1\ s\ \alpha_2\ s\ \alpha_3 s\ \alpha_4 s]$ T of $p_{BB}$s may be baseband symbol s multiplied by some complex weight $\alpha_i$. Beamforming controller 302 may then map each element of $p_{BB}$s to a respective RF chain of RF system 304, which may each perform digital to analog conversion (DAC), radio carrier modulation, and amplification on the received weighted symbols before providing the resulting RF symbols to a respective element of antenna array 306. Antenna array 306 may then wirelessly transmit each RF symbol. This exemplary model can also be extended to a multi-layer case where a baseband symbol vector s containing multiple baseband symbols $s_1$, $s_2$, etc., in which case baseband precoding vector $p_{BB}$ may be expanded to a baseband precoding matrix $p_{BB}$ for application to baseband symbol vector s. In this case, $\alpha_i$, i=1, 2, 3, 4 are row vectors, and $p_{BB}$s=$[\alpha_1\ \alpha_2\ s\ \alpha_3\ s\ \alpha_4 S]^T$. Thus, after multiplying $p_{BB}$ and s, the overall dimension is the same as the overall dimension at the output of beamforming controller 302. The below descriptions thus refer to beamforming controller 302 as $p_{BB}$ and transmit symbol/vector as s for this reason while this model can be extended to further dimensions as explained.

By manipulating the beamforming weights of $p_{BB}$, beamforming controller 302 may be able to utilize each of the four antenna elements of antenna array 306 to produce a steered beam (antenna beamforming pattern) that has greater beam gain than a single antenna element. The radio signals emitted by each element of antenna array 306 may combine to realize a combined waveform that exhibits a pattern of constructive and destructive interference that varies over distances and direction from antenna array 306. Depending on a number of factors (such as antenna array spacing and alignment, radiation patterns, carrier frequency, and the like), the various points of constructive and destructive interference of the combined waveform can create a focused beam lobe that can be "steered" in direction via adjustment of the phase and gain factors $\alpha_i$ of $p_{BB}$. FIG. 3A shows several exemplary steered beams generated by antenna array 306, which beamforming controller 302 may control by adjusting $p_{BB}$. Although only steerable main lobes are depicted in the simplified illustration of FIG. 3A, beamforming controller 302 may be able to comprehensively "form" the overall beam pattern including nulls and sidelobes through similar adjustment of $p_{BB}$.

Beamforming controller 302 may also perform adaptive beamforming, where beamforming controller 302 dynamically changes the beamforming weights in order to adjust the direction and strength of the main lobe in addition to nulls and sidelobes. With these adaptive approaches, beamforming controller 302 can steer the beam in different directions over time, which may be useful to track the location of a moving target point (e.g. a moving receiver or transmitter). In a radio communication context, beamforming controller 302 may identify the location of a target terminal device 308 (e.g. the direction or angle of terminal device 308 relative to antenna array 306) and subsequently adjust $p_{BB}$ in order to generate a beam pattern with a main lobe pointing towards terminal device 308, thus improving the array gain at terminal device 308 and consequently improving the receiver performance. Through adaptive beamforming, beamforming controller 302 may be able to dynamically adjust or "steer" the beam pattern as terminal device 308 moves in order to continuously provide focused transmissions to terminal device 308 (or conversely focused reception).

In some aspects, beamforming controller 302 may be implemented as a microprocessor. Beamforming controller 302 therefore may be able to exercise a high degree of control over both gain and phase adjustments of $p_{BB}$ with digital processing. However, as shown in FIG. 3A for RF system 304 and antenna array 306, digital beamforming configurations may use a dedicated RF chain for each element of antenna array 306 (where each RF chain performs radio processing on a separate weighted symbol $\alpha_i$s provided by beamforming controller 302); i.e. $N_{RF}$=N where $N_{RF}$ is the number of RF chains and N is the number of antenna elements. Because there may be a complex assortment of circuitry in each RF chain (DAC, amplification, mixing, etc.), these digital beamforming approaches can be expensive and power-inefficient. These issues may be worsened as the involved number of antennas increases, which may be particularly problematic for the massive antenna arrays targeted for next-generation technologies that will include tens or even hundreds of antenna elements.

Contrasting with the beamforming controller architecture of FIG. 3A, FIG. 3B shows an RF beamforming approach. As shown in FIG. 3B, beamforming controller 302 may provide baseband symbol s to RF transceiver 304. RF transceiver 304 may perform RF transmit processing on baseband symbol s and provide the resulting symbol s to each of phase shifters 310. In the example shown in FIG. 3B, phase shifters 310 may include four phase shifters 310 that each apply a respective phase shift $\beta_1$ to $\beta_4$ to s. In some aspects, phase shifters 310 may be analog RF phase shifters that apply their respective phase shifts in the analog RF domain. Phase shifters 310 may provide the resulting phase-shifted symbols $\beta_1$s to $\beta_4$s to antenna array 306. The respective antennas of antenna array 306 may wirelessly transmit the phase-shifted symbols. Similar to the operation of FIG. 3A's digital beamformer, FIG. 3B's RF beamformer may realize a specific antenna beamforming pattern by selecting the phase weights $\beta_1$ to $\beta_4$ (i.e. beamforming weights). Accordingly, beamforming controller 302 may be configured to select phase weights $\beta_1$ to $\beta_4$, such as based on the direction of terminal device 308, and provide the phase weights to $\beta_1$ to $\beta_4$ to phase shifters 310 (with the "Control" line shown in FIG. 3B). Beamforming controller 302 may therefore steer the main antenna beam towards terminal device 308 through proper selection of the phase weights $\beta_1$ to $\beta_4$. In some cases, the phase weights may be phase-only (e.g., only a phase shift with no amplitude change); in other aspects, the phase weights may have a phase and a gain component (e.g., a phase shift and an amplitude gain).

As introduced above, transmit and receive devices may use beamforming to increase transmission or reception sensitivity in certain directions. To do this, a device may select a set of beamforming weights and apply those beamforming weights to the elements of its antenna array. This may create a unique antenna beamforming pattern that transmits or receives signals with different sensitivity in different directions.

Wireless communication technologies like 5G NR and WiGig may use beamforming to increase link strength between terminal devices and network access nodes. Wireless devices may use this beamforming in both the transmit and receive directions. For example, a terminal device may use receive beamforming by configuring its antenna array to receive with a specific antenna beamforming pattern that is steered towards a target network access node. Similarly, in a transmit example, a terminal device may configure its antenna array to transmit signals with a specific antenna beamforming pattern steered towards a target network access node. Network access nodes may perform transmit and receive beamforming in the same manner. While this disclosure may describe examples using receive beamforming, this disclosure also covers those same examples using transmit beamforming.

Because there are many possible sets of beamforming weights, a device may be able to select from many different antenna beamforming patterns when it receives from a target device. Since there are many options, the device may use a beamsweeping procedure to select an appropriate antenna beamforming pattern, e.g., an antenna beamforming pattern that steers the device's antenna array in the direction of the target device. In an exemplary beamsweeping procedure, a transmit device may transmit a reference signal to a receive device (e.g., using an omnidirectional antenna beamforming pattern). The receive device may then receive the reference signal with a first antenna beamforming pattern and obtain a first measurement. The transmit device may continue to transmit the reference signal, such as by periodically or intermittently transmitting the reference signal in each of a sequence of reference signal sentences. The receive device may then receive the reference signal (e.g., in a later reference signal instance) with a second antenna beamforming pattern and obtain a second measurement. The receive device may test a plurality of the antenna beamforming patterns by obtaining a measurement for each. After obtaining the measurements, the receive device may determine which antenna beamforming pattern yielded the strongest measurement (e.g., a highest signal strength measurement). The receive device may then select that antenna beamforming pattern and use it to receive data signals from the transmit device. The receive device may repeat the beamsweeping procedure over time, and in doing so repeatedly updates the antenna beamforming pattern so that it tracks the transmit device as they move. Devices may also use beamsweeping for transmit beamforming, such as where a transmit device transmits a reference signal with different antenna beamforming patterns and a receive device reports back which antenna beamforming pattern produced the highest signal radio measurement at its end.

Various radio communication technologies including the third generation wireless mobile telecommunication technology (3G), the fourth generation wireless mobile telecommunication technology (4G), and NR have included multiple-input multiple-output (MIMO) communication in various types such as Multi-User MIMO, Cooperative MIMO, and Massive MIMO with an intention to increase the spectral efficiency. In order to increase the throughput of the radio communication network and to support more users, there may be a tendency to increase the number of antennas used especially by base stations (BS) such as an evolved NodeB (eNB) or a next generation NodeB (gNB).

In order to be able to use the beams effectively, increased number of antennas may result in an increase to the possible sets of beamforming weights. In various examples, the devices may communicate by using beamforming weights according to a predefined codebook by selecting a set of beamforming weights (e.g. a beamforming vector) from many possible sets of beamforming weights based on various methods including the measurements, but as the number of possible sets of beamforming weights increases in the codebook, the number of measurements to perform may also increase until the receive device determines the antenna beamforming pattern, as the receive device may need to perform more measurements to determine an effective antenna beamforming pattern.

Figure 4A:
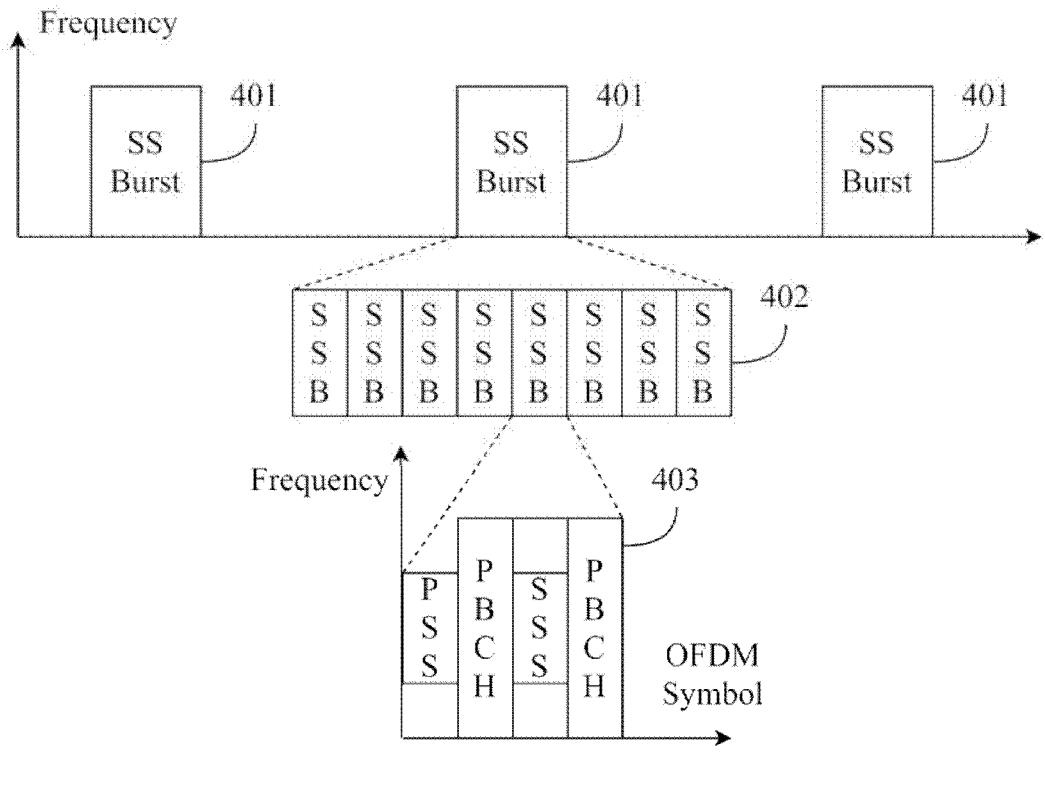
FIG. 4A exemplarily shows an illustration related to synchronization signal bursts in 5G RAN.

FIG. 4A exemplarily shows an illustration related to synchronization signal bursts in 5G RAN. A base station (BS) (e.g. gNB) sends synchronization signal bursts (SS burst) 401 periodically (e.g. T=20 ms.) and each signal may include a number of synchronization signal blocks (SSBs) 402 depending on the configuration of the radio communication network. Each SSB 403 includes four symbol blocks. The first symbol block carries a primary synchronization signal (PSS), the second symbol block and the fourth symbol block carry physical broadcast control channel (PBCH) data including demodulation reference signal (DM-RS). The third symbol block carries a secondary synchronization signal (SSS) together with PBCH. The SS burst may include a plurality of SSBs which the BS transmits using different sets of beamforming weights into different beamforming directions.

Figure 4B:
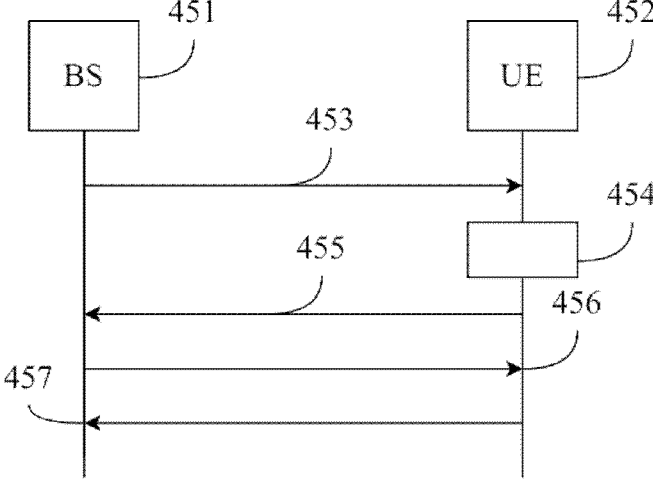
FIG. 4B exemplarily shows an illustration with respect to a random access procedure in 5G RAN.

FIG. 4B exemplarily shows an illustration with respect to a random access procedure in 5G RAN between a base station (e.g. gNB) and a user equipment (UE). The base station (BS) 451 transmits 453 one or more signal bursts including a plurality of SSBs that the BS 451 beamformed using different sets of beamforming weights. The UE 452 receives the SSBs and performs measurements on the received SSBs to determine 454 a transmit beam by decoding DM-RS and calculating reference signal received power (RSRP) and/or reference signal received quality (RSRQ) for the received SSBs. Based on the measurements, the UE 452 determines the transmit beam and transmits 455 a message to the BS 451. In response to the message, the BS 451 may transmit 456 a message including channel status information reference signals (CSI-RSs) specific to the UE 452, on which the UE 452 may perform further measurements and transmit 457 a message including a channel status information (CSI). Furthermore, the UE 452 and the BS 451 may perform further refinement of the beams using periodic or aperiodic CSI-RS which the BS 451 transmits when the connection between the UE 452 and the BS 451 is established.

In 5G RAN, CSI-RS and CSI exchanges may be used to maintain transmit beams and receive beams for both transmit and receive directions via a set of layer-1 and layer-2 procedures for both uplink and downlink communication. Exemplarily, WLAN technology employs periodically performed sector level beam sweeps to determine the candidate beams to be used with the radio communication. Subsequently, a beam refinement protocol in WLAN may also need an effort to measure the effective complex channel matrix for beamformed channels at the receiver side.

Figure 5:
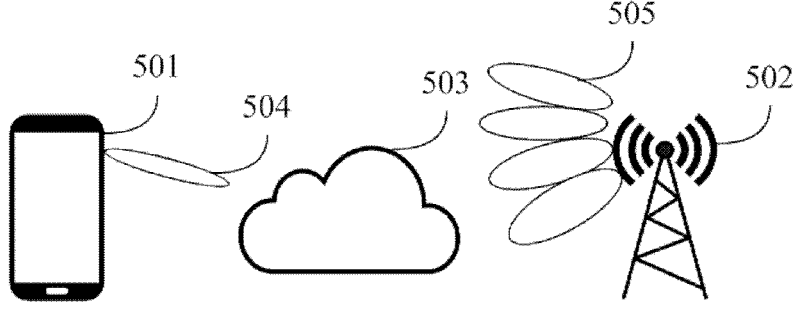
FIG. 5 exemplarily shows an illustration with respect to radio communication.

FIG. 5 shows an illustration with respect to a radio communication between two TRPs, including a first TRP 501 which is depicted as a UE, and a second TRP 502 which is depicted as a BS. The first TRP 501 and the second TRP 502 may communicate over a radio communication channel 503 in which the second TRP 502 may transmit a plurality of reference signals 505 transmitted with different sets of beamforming weights and the first TRP 501 may measure the transmitted plurality of reference signals 505 and, in response to the measurement, transmit a plurality of measurement results to the second TRP 502.

The second TRP 502 may include a number of $N_T$ transmit antennas and the first TRP 501 may include a number of NR receive antennas. Accordingly, for each spectral source, the signal that the first TRP 501 receives may be modeled by the equation y=Hx+n, where His a complex representation of the radio communication channel 503 as a channel matrix having $N_R \times N_T$ dimensions, and n is the additive noise. The first TRP 501 may use a receive beamforming vector u including a number $N_R$ of beamforming weights, and each reference signal may be modeled as x=ws, with w representing a transmit beamforming vector including a number of $N_T$ beamforming weights, and s representing a complex reference symbol. Accordingly, the received radio communication signal using the beamforming vector u at the first TRP 501 may be represented as $r=u^H Hws+n=h^H ws+n'$, where n' represents filtered noise. The effective receive filtered channel may be represented as $h^H=u^H H$.

Based on the measurement results that the first TRP 501 provides to the second TRP 502 (e.g. via a message that the first TRP 501 transmits including CSI), the second TRP 502 may refine the transmit beamforming vector that the second TRP 502 uses for transmitting radio communication signals to the first TRP 501. The second TRP 502 may be configured to arrange the transmit beams for the first TRP 501 according to many beamforming configurations (via many sets of different beamforming vectors). Exemplarily, a TRP suitable for massive MIMO technology may include an antenna array having 64 antenna elements, resulting in hundreds of candidate beamforming vectors, and in order to obtain the most efficient transmit beamforming vector for the hundreds of candidate beamforming vectors, it may not be desirable to receive measurements for each of the candidate beamforming vectors in an iterative manner to select the most efficient transmit beamforming vector. The candidate beamforming vectors may be represented as a predefined codebook, and the TRP may be configured to select the beamforming vector from the codebook.

Figure 6:
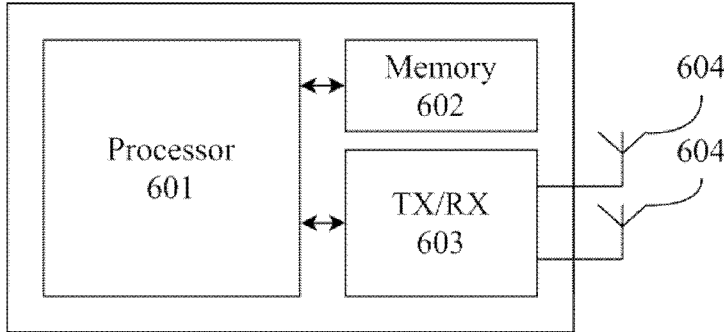
FIG. 6 exemplarily shows an example of a device according to various examples in this disclosure.

FIG. 6 exemplarily shows an example of a device according to various examples in this disclosure. The device is depicted as a radio communication device in this illustrative example, comprising a processor 601, a memory 602, and a transceiver 603 configured to receive and transmit radio communication signals using a plurality of antenna elements 604. The illustration depicts that there are two antenna elements coupled to the transceiver 603, however, this should not be considered as limiting, and the radio communication device may be coupled to any number of antenna elements. The transceiver 603 may include a plurality of antenna ports couplable to the plurality of antenna elements 604. The transceiver 603 may be configured to support beamforming operations for both transmit beamforming operations and receive beamforming operations as exemplified in FIGS. 3A and 3B using beamforming weights. The processor 601 may include one or more processors which may include a baseband processor as well.

The transceiver 603 may transmit a plurality of reference signals for another communication device, which are beamformed into at least two directions. The transceiver 603 may transmit the plurality of reference signals that are beamformed based on two or more different sets of beamforming weights. Accordingly, each reference signal may be beamformed based on a set of beamforming weights that is different from a set of beamforming weights of at least one other reference signal of the plurality of reference signals.

In a configuration, especially in which the radio communication device may be a base station (as the example referred in FIG. 5), the reference signals may include CSI-RSs or SSBs beamformed at least into two directions using at least two different sets of beamforming weights (i.e. beamforming vectors). The reference signals may be located in various time resources in the time domain, or in various spectral resources in frequency the domain. The transceiver 603 may transmit the plurality of reference signals in a predefined period, and the processor 601 may allocate resources and schedule the transmission of the plurality of reference signals to transmit the signals in the predefined period. Alternatively, the processor 601 may allocate resources to transmit the plurality of reference signals aperiodically (e.g. based on a received request or a condition detected by the processor 601 for an established communication).

The processor 601 may determine the beamforming vectors to be used to obtain the plurality of reference signals in various configurations. The processor 601 may use a specific codebook (e.g. a first codebook) that is previously generated for the purpose of beamforming the reference signals, which is a different codebook from a predefined codebook that the processor 601 use to precode data streams in the beam management operation. The radio communication device may be the BS, and the radio communication may use the first codebook only to beamform the reference signals, and the predefined codebook only to beamform any other radio communication signals in downlink radio communication.

The plurality of reference signals may be beamformed into random directions. The transceiver 603 may transmit the reference signals which are beamformed using random sets of beamforming weights, or randomly generated beams. The processor 601 may control the transceiver 603 based on a random set of beamforming weight or randomly generated beamforming weights to transmit the reference signals.

The processor 601 may determine the beamforming vectors for the reference signals by generating random beamforming vectors based on a predefined set of conditions including maximum and minimum complex values for each beamforming weights. The processor 601 may perform random selections over the beamforming vectors that the predefined codebook includes to generate the first codebook temporarily to transmit the reference signals into random directions. The processor 601 may use any known methods to determine the beamforming vectors for the reference signals in a random manner.

Figure 7:
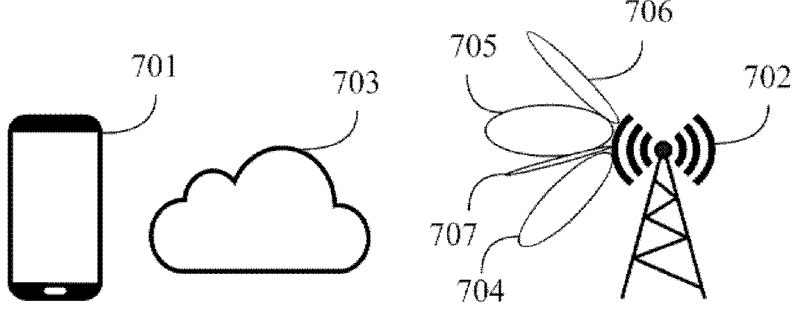
FIG. 7 shows an example illustrating randomly generated beams for measurements in a radio communication environment.

FIG. 7 shows an example illustrating randomly generated beams for measurements in a radio communication environment. The first TRP 701 may expect measurement signals from the second TRP 702 over one or more communication channels and the second TRP 702 may transmit a plurality of reference signals beamformed into random directions. The second TRP 702 may transmit a first reference signal beamformed using a first random beamforming vector, a second reference signal beamformed using a second random beamforming vector, a third reference signal beamformed using a third beamforming vector, and a fourth reference signal beamformed using a fourth beamforming vector. In this illustrative example, the reference signals seem to beamformed into distinct directions, but the skilled person would realize that the directions may not be such distinctly formed, and there may be overlaps in the directions, etc.

Furthermore, the processor may optimize the beamforming vectors used to transmit reference signals in time. Randomly determined beamforming vectors may asymptotically optimal with certain assumptions. Accordingly, in a first operation mode, the processor 601 may control the transceiver 603 to transmit reference signals by using the beamforming vectors that are determined in a random manner and store the random beamforming vectors in the memory 602, for example in a temporary codebook. Furthermore, the processor 601 may estimate a performance index for each stored random beamforming vector based on the respective measurement result received for the respective random beamforming vector.

During the first operation mode, the processor 601 may decide to discard random beamforming vectors from the temporary codebook based on a predefined condition. For example, the respective measurement results may indicate that the result of the measurement is above a predefined threshold or a predetermined threshold for the respective beamforming vector. The processor 601 may determine to keep the random beamforming vectors in the temporary codebook according to the predefined condition.

In a second operation mode, the processor 601 may control the transceiver 603 to transmit the reference signal according to the temporary codebook, or in other words with the first codebook in which the randomly generated beamforming vectors of the temporary codebook is transferred. Accordingly, while the device transmits reference signals using randomly determined beamforming vectors in the first operation mode, the device transmits reference signals using the first codebook including the selected randomly determined beamforming vectors in the second operation mode. The processor 601 may change the operation mode after a predefined number of measurements in the first operation mode, or after the processor 601 determines a predefined number of beamforming vectors to be kept for the second operation mode.

Figure 8:
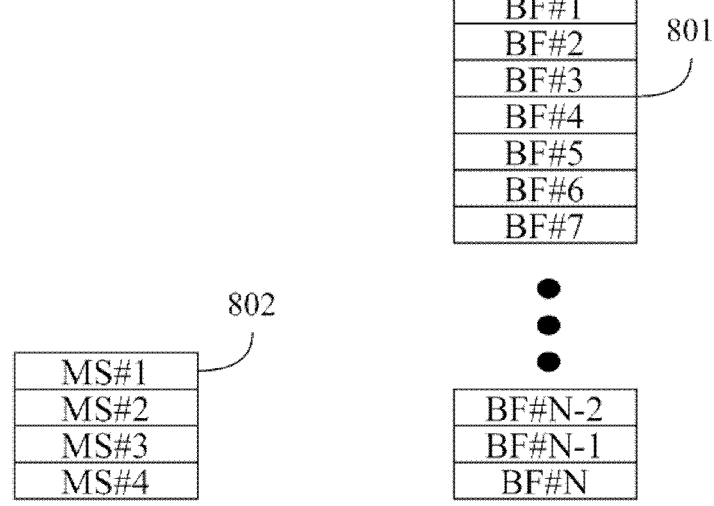
FIG. 8 exemplarily shows an illustration including the predefined codebook and the number of sets of beamforming weights used for reference signals.

FIG. 8 shows an illustration including the predefined codebook and the number of sets of beamforming weights used for reference signals. The predefined codebook 801 may include a number of N beamforming vectors that the device may use for radio communications with other devices. As provided in this disclosure, the transceiver 603 may transmit the reference signals with a much smaller number of M beamforming vectors 802 (depicted as 4 measurement vectors), exemplarily from the first codebook different from the predefined codebook to receive the plurality of measurements from another device. As also provided in this disclosure, the processor 601 may determine the beamforming vectors randomly, or based on further calculations as explained in this disclosure. These beamforming vectors may be referred to as measurement beamforming vectors in this disclosure.

The transceiver 603 may receive radio communication signals from another device in response to the reference signals, which the radio communication signals may include a plurality of measurement results representing measurements for at least some of the reference signals. The received radio communication signals may include an indication of a mapping between the reference signals and the measurement results (e.g. an identifier, arrival time information, etc.). The processor 601 may determine which measurement result corresponds to which reference signals via various methods, including based on the indication, allocated resources for the reference signals, etc. The processor 601 may control the memory 602 to store the received measurement results.

The measurement results may include information indicating a sampling of baseband in-phase and quadrature signals (IQ samples), a received power of the signal, a reference signal measurement (e.g. a reference signal received power (RSRP), a reference signal received quality (RSRQ), etc.), or further measurements indicating the received reference signal that the another device performed in response to the reference signals. In various examples related to the measurements with respect to the received powers, each measurement result may include a power parameter $p_i = |z_i^2|$ for all measurements, such that the measurement results may be represented as a vector $p = (z_1|^2|$ $z_2|^2, \ldots, |z_M|^2)$. In various examples, the processor 601 may quantize the measurement results.

Furthermore, the processor 601 may provide the received measurement results to an artificial intelligence/machine learning model (AI/ML) configured to determine a parameter for the beam management operation to manage the beams that the device uses for the radio communication between the device and the another device. The processor 601 may implement the AI/ML based on a plurality of machine model parameters stored in the memory, or alternatively provide the received measurement results to an external processor or an external computing device that is configured to implement the AI/ML as provided in this disclosure. The processor may include an accelerator or a neuromorphic processor to implement the AI/ML.

The device may perform the beam management operation, including beam refinement for the another communication device and estimation of the communication channel with the predefined codebook that includes many beamforming vectors. It may be desirable to use an AI/ML with the measurement results in response to a plurality of reference signals beamformed using beamforming vectors, which the numbers are much smaller than the beamforming vectors of the predefined codebook, since the AI/ML may predict an optimal beamforming vector used from the predefined codebook according to the measurement results. It may be assumed that the channel vector is constant for all of the measurements, and the measurements may be collected within a coherence bandwidth and/or coherence time.

Figure 9:
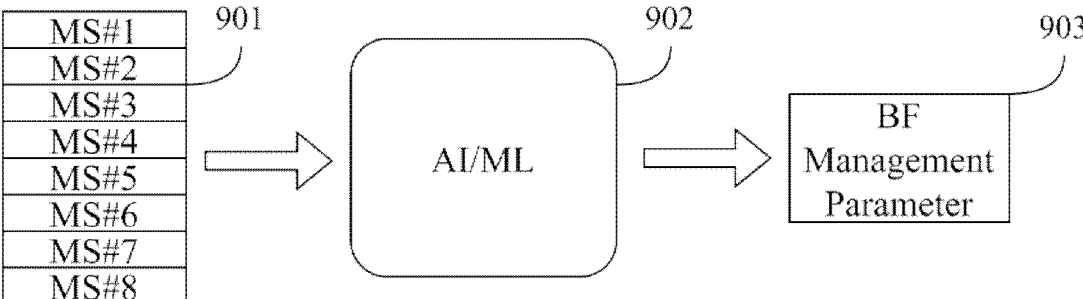
FIG. 9 shows schematically an example of an AI/ML.

FIG. 9 shows schematically an example of an AI/ML. The AI/ML 902 may be any type of machine learning model configured to receive an input comprising the plurality of measurement results 901 and provide an output 903 indicating a parameter to be used for beam management operation according to a predefined codebook. The input 901 may further include information with respect to the reference signals, such as beamforming vectors. For example, each measurement result may be provided with the corresponding beamforming vector used to beamform the respective reference signal as a sequence (e.g. a tuple). In various examples, the processor may also provide the predefined codebook to the AI/ML 902.

The AI/ML 902 may include any type of machine learning model suitable for the purpose. The AI/ML 902 may include a neural network, including various types of neural networks. The neural network may be a feed-forward neural network in which the information is transferred from lower layers of the neural network close to the input 901 to higher layers of the neural network close to the output 903. Each layer includes neurons that receive input from a previous layer and provide an output to a next layer based on certain weight parameters adjusting the input information.

The AI/ML 902 may include a convolutional neural network (CNN), which is an example for feed-forward neural networks that may be used for the purpose of this disclosure, in which one or more of the hidden layers of the neural network include a convolutional layer that performs convolutions for their received input from a lower layer. The CNNs may be helpful for pattern recognition and classification operations. The CNN may further include pooling layers, fully connected layers, and normalization layers.

The neural network may be a recurrent neural network in which the neurons transfer the information in a configuration that the neurons may transfer the input information to a neuron of the same layer. Recurrent neural networks may help to identify patterns between a plurality of input sequences. In various examples, the neural network may be configured in top-down configuration in which a neuron of a layer provides output to a neuron of a lower layer, which may help to discriminate certain features of an input.

The AI/ML 902 may include a reinforcement learning model. The reinforcement learning model may be modeled as a markov decision process (MDP). The MDP may determine an action from an action set based on a previous observation which may be referred to as a state. In a next state, the MDP may determine a reward based on the next state and the previous state. The determined action may influence the probability of the MDP to move into the next state. Accordingly, the MDP may obtain a function that maps the current state to an action to be determined with a purpose of maximizing the rewards.

The AI/ML 902 may include a trained AI/ML 902 configured to provide the determined parameter based on the input 901 including a plurality of measurement results. The trained AI/ML 902 may be obtained via an online and/or offline training. For the offline training, a training agent may train the AI/ML 902 based on conditions of the device including the predefined codebook, the antenna ports of the transceiver 603, the antennas 604 coupled to the device, etc. in a past instance of time. Furthermore, the training agent may train the AI/ML 902 (e.g. by adjusting the machine learning model parameters stored in the memory) using online training methods based on the latest (or actual) implementation conditions, such as the location of the device, etc. Furthermore, the processor 601 may further optimize the AI/ML 902 based on previous inference results including the determined parameter, and possibly based on a performance metric with respect to the determined parameter and the effect of the determined parameter with respect to the beam management operation (e.g. throughput, number retransmissions, number of cyclic redundancy check (CRC) error, etc.).

The training agent may train the AI/ML 902 according to the desired outcome. The training agent may provide the training data to the AI/ML 902 to train the AI/ML 902. The training data may include input data with respect to simulated operations. The training data may include measurement results generated in response to the beamforming vectors used for reference signals. In various examples, the training agent may obtain the training data based on beam management operations performed in various conditions, such as various distances to the communication device that performs the measurements, various interference conditions based on the state of the network, different mobility conditions for the devices, etc. The training agent may store the information obtained from the beam management operations performed in such conditions to obtain the training data.

The training agent may train the AI/ML 902 based on the desired parameter for the beam management operation according to the predefined codebook. The training agent may use a candidate target function to train the AI/ML 902 to obtain a target function. For example, in a configuration that the determined parameter includes an indication of an optimal beamforming vector according to the predefined codebook, the candidate target function may be configured to select the beamforming vector from the predefined codebook which maximizes the respective effective channel gain ($\mathrm{argmax}|h^H w|^2$) based on the input 901. For example, in a configuration that the determined parameter includes effective channel gains for one or more, or each of the beamforming vectors from the predefined codebook, the candidate target function may be configured to provide the effective channel gains ($|h^H w|^2$) for the desired vectors with less errors based on the input 901. For example, in a configuration that the determined parameter includes effective channel responses for one or more, or each of the beamforming vectors from the predefined codebook, the candidate target function may be configured to provide the effective channel responses ($h^H w$) for the desired vectors with fewer errors based on the input 901. The target function may be configured accordingly according to any example provided in this disclosure.

In various examples, once the target function of the AI/ML 902 is obtained, the AI/ML 902 may provide the output 903 based on the input 901 according to the target function. The target function may map the input 901 according to the parameters of the target function to the output 903. In various examples, the target function may include a mapping by a linear calculation of the parameters received from the input 901, providing a linear mathematical function. For example, in the configuration to select the optimal beamforming vector from the predefined codebook, the form of the target function may be modeled as $|(\Psi^H z)^H|$, where $\Psi$ is a function of the measurement beamforming vectors and other communication parameters, such as signal to noise ratio (SNR). Furthermore, based on the output 903 of the AI/ML 902 and a performance metric, the training agent may optimize the parameters of the target function.

The processor 601 may implement the training agent, or another entity that may be communicatively coupled to the processor 601 may include the training agent and provide the training data to the device, so that the processor 601 may train the AI/ML 902. In various examples, the device may include the AI/ML 902 in a configuration that it is already trained (e.g. the machine model parameters in the memory are set). It may desirable for the AI/ML 902 itself to have the training agent, or a portion of the training agent, in order to perform optimizations according to output 903 of the inferences to be performed as provided in this disclosure.

Figure 10:
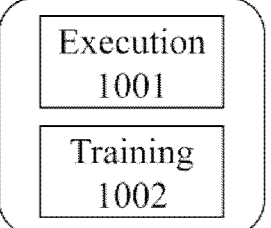
FIG. 10 shows schematically a diagram of an AI/ML.

FIG. 10 shows schematically a diagram of an AI/ML. The AI/ML may include an execution module 1001 configured to receive the input and provide the output, and a training module 1002 including the training agent as provided in this disclosure. In an example, the training module 1002 may further include a neural network to train the execution block 1001.

Figure 11:
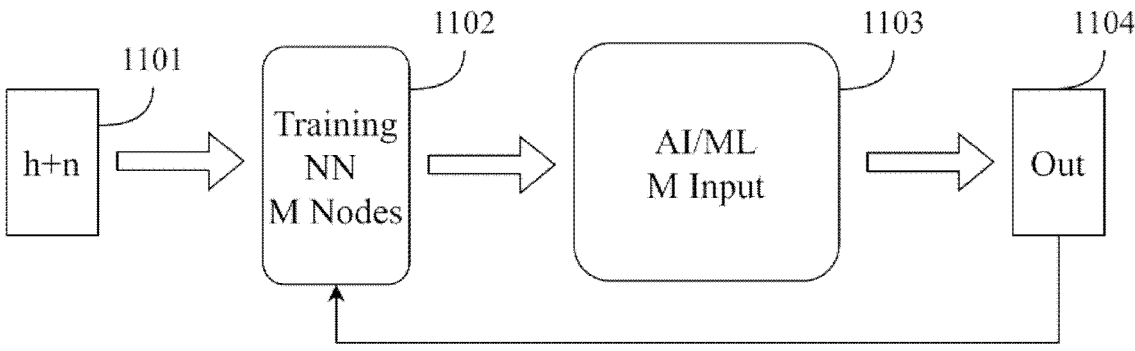
FIG. 11 exemplarily shows an illustration of a training model to obtain measurement beamforming vectors.

FIG. 11 exemplarily shows an illustration of a training model to obtain measurement beamforming vectors. The neural network 1102 that the training module 1001 may include, includes a layer including a plurality of nodes configured to receive data of a training input 1101. The neural network may be configured, in a manner such that each node may provide a training output based on the received data of the training input 1101 with a linear activation function of $y_i=f(v_i^H x+b_i)$, in which v is represented by a weight coefficient vector v multiplying the received data of the training input x, and a bias parameter b for each of i nodes. The neural network 1102 may be a fully connected neural network.

The input data 1101 may include a matrix representing a channel response, to be more precise the input may be $x=h^H+n$. Assuming that the processor 601 is configured to provide a number M of measurement results to the AI/ML 1103, or in other words, the execution module 1001 is configured to receive the input including M number of measurements for the reference signals provided by M measurement beamforming vectors, and M is defined, the number of the plurality of nodes may also be configured to be M number of nodes that receive the data of the training input 1101 and provide the training output from M number of nodes.

Accordingly, the AI/ML 1103 receives the output of the neural network 1102 and provides the output 1104 including the determined parameter for the beam management operation according to the predefined codebook. Furthermore, based on the output 1104 the neural network 1102 may be optimized by adjusting the weight vector coefficient. Once the training is completed, the AI/ML 1103 provides information indicating the weight vector coefficients to the processor 601. Accordingly, the processor 601 may obtain the reference signals using the weight vector coefficients of the linear activation function of the neural network 1102 as the measurement beamforming vectors.

Figure 12:
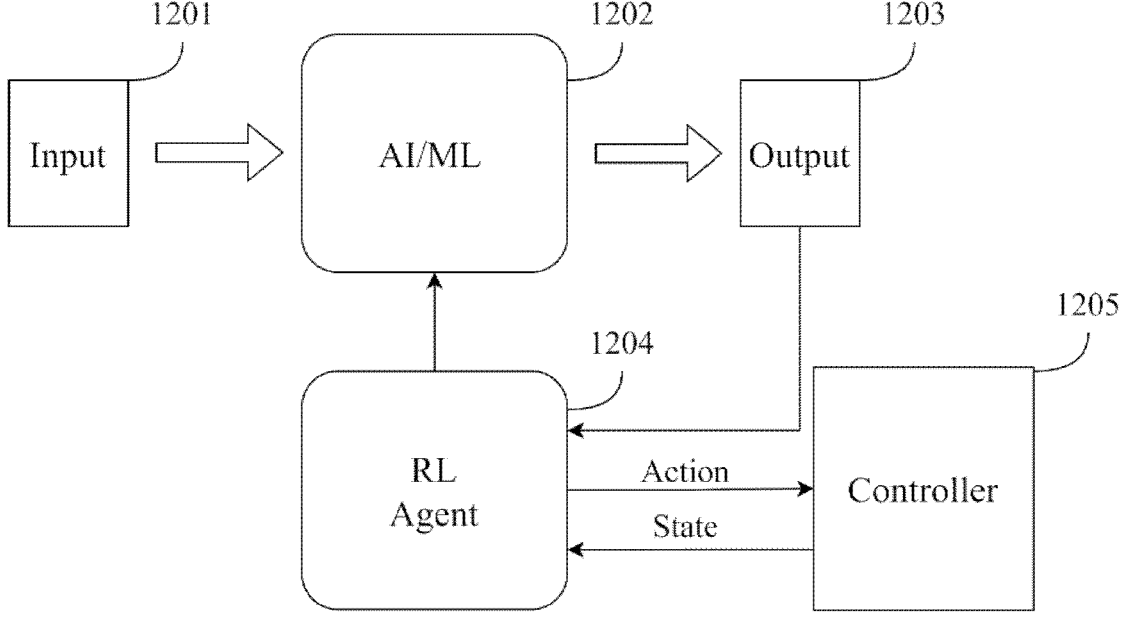
FIG. 12 shows schematically an example illustrating the reinforcement learning model implemented in the training module.

In one example, the training module 1002 may include a reinforcement learning model to train the AI/ML 902 autonomously based on the output of the AI/ML 902. FIG. 12 shows schematically an example illustrating the reinforcement learning model implemented in the training module. The AI/ML 1202 includes the execution block and it may be configured to receive the input 1201 including the measurement results based on reference signals transmitted using measurement beamforming vectors and provide the output 1203 including the determined parameter. In this illustrative example, the output 1203 may include the beamforming vector that the AI/ML 1202 may select from the predefined codebook based on the input 1201.

A reinforcement learning agent (RL agent) 1204 that the training module implements may receive the selected beamforming vector from the output 1203 of the AI/ML and based on a first state that a controller 1205 (e.g. controller that the processor 601 includes) provides and a reward associated for the first state, the RL agent 1204 may determine an action which may include to perform the beam management operation using the selected beamforming vector or perform the beam management operation using another beamforming vector. The RL agent 1204 may select the another beamforming vector from the predefined codebook in a random manner or according to a predefined policy. The RL agent 1204 may indicate the action to the controller 1205 which may perform the beamforming operation, and the controller 1205 may control the transceiver (or beamforming controller) to transmit radio communication signals beamformed with the indicated beamforming vector.

Furthermore, the RL agent 1204 may receive information indicating a second state with respect to the determined action, such as throughput of the transmission with the indicated beamforming vector, and determine a reward based on the transition from the first state to the second state with a goal to learn the policy maximizing the expected cumulative reward. In various examples, the RL agent 1204 may adjust the machine learning model parameters and optimize the AI/ML 1202 based on the states and rewards associated with the states at further instances of time. The RL agent 1204 may store information indicating states, actions, and rewards in a memory (e.g. the memory 602) to retrain the AI/ML 1202 periodically.

Figure 13:
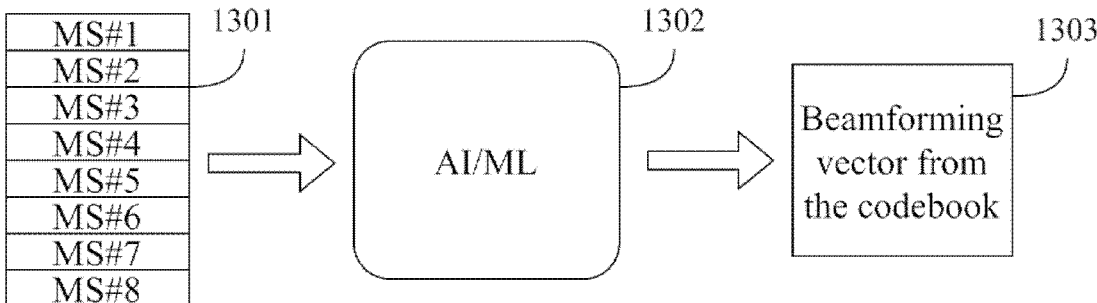
FIG. 13 exemplarily shows an illustration for an AI/ML.

FIG. 13 shows an illustration for an AI/ML that the device may use. In this illustrative example, the processor 601 may provide the input 1301 comprising the plurality of measurement results with respect to the reference signals that are beamformed using measurement beamforming vectors to the AI/ML 1302 that is configured to select the optimal beamforming vector 1303 from the predefined codebook to perform the beam management operation. The AI/ML 1302 may include a trained AI/ML as provided in this disclosure to provide the output based on the input. The AI/ML 1302 may be configured to select the beamforming vector 1303 from the predefined codebook which maximizes the received power of the radio communication signal that the transceiver 603 transmits. In various examples, the AI/ML 1302 may be configured to predict the channel response for the transmission to the another communication signal based on the measurement results and calculate the power for each beamforming vector in the predefined codebook and select the beamforming vector 1303 that maximizes the effective channel gain for the transmission.

Accordingly, the processor 601 may receive the information indicating the selected beamforming vector from the AI/ML 1302 and precode the signal scheduled for transmission to the another communication device, or control a further controller (e.g. a beamforming controller) to beamform the signal using the selected beamforming vector. Accordingly, the transceiver 603 may transmit the radio communication signal beamformed using the selected beamforming vector to the another communication device. In various examples, in which the device may be a BS, the transceiver 603 may transmit a CSI-RS or a message including transmission configuration indicator (TCI) beamformed with the selected beamforming vector.

Figure 14:
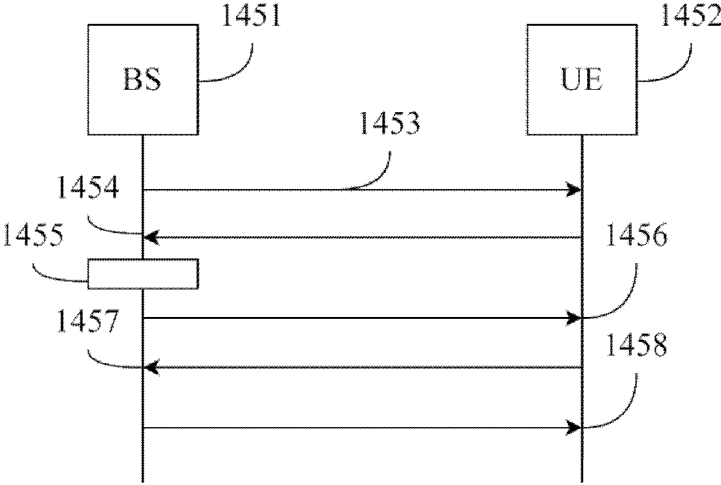
FIG. 14 exemplarily shows an illustration of a beam management operation in a radio communication system.

FIG. 14 shows an illustration of a beam management operation in a radio communication system. In this illustrative example, the BS 1451 may include the device, and the another communication device is depicted as the UE 1452. The BS 1451 may send 1453 a plurality of reference signals to the UE 1452 that are beamformed by measurement beamforming vectors. The reference signals may include SSBs or CSI-RSs for beam management. The UE 1452 may perform measurements with the reference signals and transmit the measurement results to the BS 1451 that receives 1454 the measurement results. The BS 1451 may determine 1455 the beamforming vector from the predefined codebook to be used to communicate with the UE 1452 as provided in this disclosure using an AI/ML and transmit a TCI or CSI-RS for channel acquisition with the selected beamforming vector. The UE 1452 may receive 1456 the transmitted signal of the BS 1451 and perform calculations based on the selected beamforming vector and transmit a message including a channel quality indicator (CQI), a precoding matrix indicator (PMI), or a rank indicator (RI) to the BS 1451 that receives 1457 the transmitted message and grant a physical downlink shared channel (PDSCH) and transmit 1458 the DM-RS for PDSCH decoding.

Figure 15:
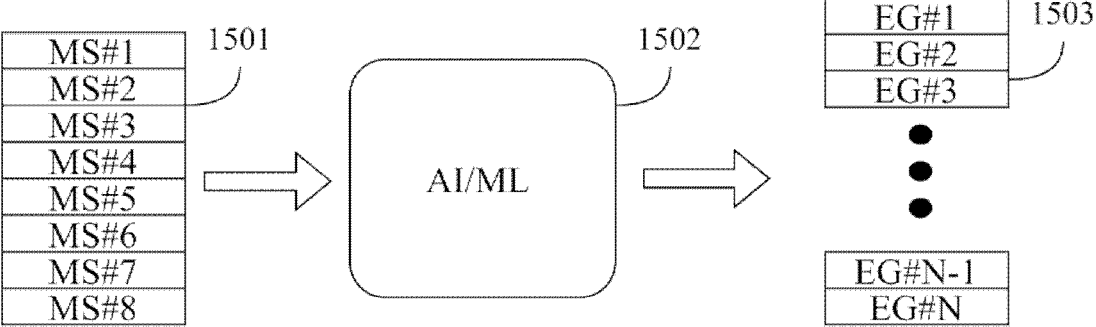
FIG. 15 exemplarily shows an illustration of an AI/ML.

FIG. 15 shows an illustration of an AI/ML that the device may use. In this illustrative example, the processor 601 may provide the input 1501 comprising the plurality of measurement results with respect to the reference signals that are beamformed using measurement beamforming vectors to the AI/ML 1502 that is configured to provide output including the effective beamformed channel gains 1503 for one or more beamforming vectors of the predefined codebook to perform the beam management operation. It is depicted in the illustrative example that output includes the effective beamformed channel gains 1503 for each of the beamforming vectors. The AI/ML 1502 may include a trained AI/ML as provided in this disclosure to provide the output based on the input. In various examples, the AI/ML 1502 may be configured to predict the channel response for the transmission to the another communication signal based on the measurement results and the processor may calculate the effective beamformed channel gains 1503 for each beamforming vector in the predefined codebook.

For this illustrative example, a BS may include the device, which is communicatively coupled to a plurality of other communication devices (e.g. UEs). Based on measurements obtained from the plurality of other communication devices, the processor 601 may determine the effective beamformed channel gains for the plurality of other communication devices using the AI/ML 1502. Accordingly, the processor 601 may receive the information indicating the effective beamformed channel gains for the plurality of other communication devices from the AI/ML 1502 and calculate signal to interference and noise ratio (SINR) for each other communication device. The SINR calculation may be obtained for one of the other communication devices with an index i by $SINR_i=(EG_i)/(\Sigma_{j\neq i}+EG_j+\sigma^2)$. Accordingly, the BS may allocate resources, select beamforming vectors to be used for transmissions with the other communication devices from the predefined codebook, and schedule the transmissions to the other communication devices optimally based on the SINR calculations.

Figure 16:
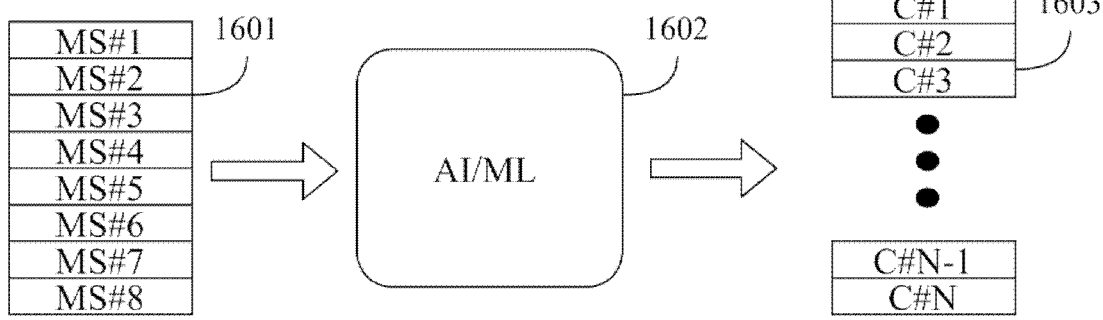
FIG. 16 exemplarily shows an illustration of an AI/ML.

FIG. 16 shows an illustration of an AI/ML that the device may use. In this illustrative example, the processor 601 may provide the input 1601 comprising the plurality of measurement results with respect to the reference signals that are beamformed using measurement beamforming vectors to the AI/ML 1602 that is configured to provide output including the effective channel responses with respect to one or more beamforming vectors 1603 of the predefined codebook to perform the beam management operation. It is depicted in the illustrative example that output includes the effective channel responses with respect to each of the beamforming vectors 1603. The AI/ML 1602 may include a trained AI/ML as provided in this disclosure to provide the output based on the input. In various examples, the AI/ML 1602 may be configured to predict the channel response for the transmission to the another communication signal based on the measurement results and calculate the effective channel responses for each beamforming vector in the predefined codebook.

The skilled person may recognize that the number of measurement results may be different for the examples provided with respect to the determined parameter for the beam management operation. While selecting the optimal beamforming vector from the predefined codebook may require fewer measurements results as input relative to, for example, estimating the channel response. Because the nature of the channel response being represented as a complex entity, it may be desirable to provide more measurement results to the AI/ML. The processor 601 may determine the number of measurement results for each application to determine the parameters based on the parameter to be determined. In one example, the processor 601 may determine the number of measurement results that the processor 601 may provide to the respective AI/ML from a look-up table providing the desired number of measurement results for each parameter. Furthermore, for this illustrative example, the AI/ML 1602 may be configured to process the real part and the imaginary part separately in order to obtain the estimated channel response represented as a complex entity.

For this illustrative example, a BS may include the device, which is communicatively coupled to at least one other communication device (e.g. UE). Based on the received measurements, the processor 601 may determine the effective channel responses with respect to the one or more beamforming vectors from the predefined codebook. The BS may use the estimated channel responses in various beamforming operations, including spatial multiplexing for the at least one other communication device, and arranging the spatial multiplexing pattern for the at least one other communication device based on CSI-RS ports for second stage data channel beamforming or combining.

Figure 17:
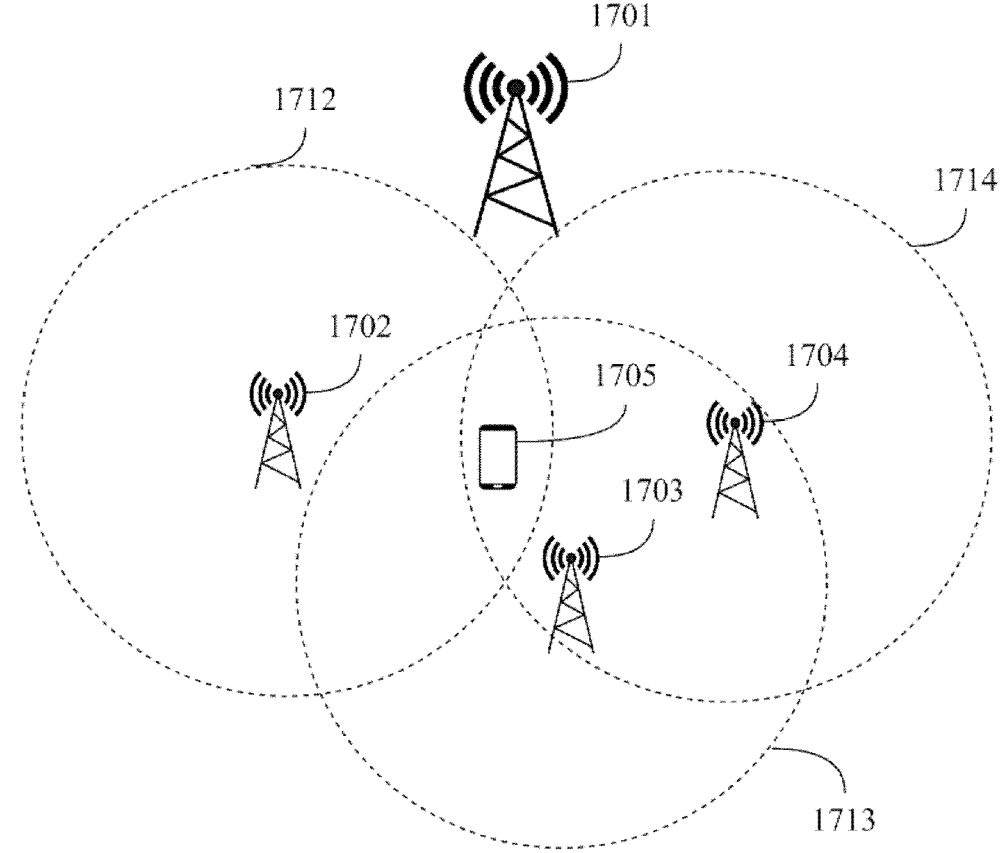
FIG. 17 exemplarily shows a representation of a radio communication network.

FIG. 17 exemplarily shows a representation of a radio communication network. The radio communication network may employ a distributed architecture, such as an open radio access network (O-RAN) including a distributed unit (DU or O-DU) (1701) including the device as provided in this disclosure, a first radio unit (RU or O-RU) 1702, a second RU 1703, and a third RU 1704. The structure of DU/RU split may be configured according to any exemplary combination, such as 7-2. The RUs are communicatively coupled to the DU (or one or more DUs) via fronthaul interfaces. In various examples, the RUs may be communicatively coupled to the DU via another interface (e.g. a radio communication interface). The RUs may be configured to receive radio communication signals from the radio communication devices including the radio communication device 1705 and provide data streams based on the received radio communication signals to the DU in uplink configuration. Similarly, the RUs may receive data streams from the DU and transmit radio communication signals to the radio communication device 1705 in downlink configuration.

The first RU 1702 may be operable in a first sector 1712, the second RU 1703 may be operable in a second sector 1713, and the third RU 1714 may be operable in a third sector 1714. Accordingly, the radio communication device 1705 may receive services from any of the first RU 1702, the second RU 1703, or the third RU 1704 as provided in the illustrative example. The DU 1701 may include the device configured to receive measurement results and perform beam management operation based on a determined parameter using an AI/ML according to the received measurement results.

The DU 1701 may send a message to the RUs 1702, 1703, 1704 to transmit a plurality of reference signals that are beamformed using measurement beamforming vectors. The DU 1701 may further provide to each RU 1702, 1703, 1704 the measurement beamforming vectors which the RUs 1702, 1703, 1704 use to beamform the reference signals. Each RU 1702, 1703, 1704 may transmit a plurality of reference signals based on the message received from the DU 1701 that are beamformed using the measurement beamforming vectors. $\Phi_i^{(t)}$ denoting the reference signal i that one of the t RUs 1702, 1703, 1704 transmits, the radio communication device 1705 may receive reference signals from multiple RUs, which may be represented as $z=\Sigma_t h_t^H \Phi^{(t)} + n$, where $h_t$ is the channel response from transmitter t to the radio communication device 1705. Accordingly, a stacked channel vector may be defined as $h=(h_1^H, h_2^H, \ldots, h_T^H)^H$, and the stacked measurement matrix $\Phi=((\Phi^{(1)})^H, \ldots, (\Phi^{(T)})^H)$. Accordingly, an AI/ML of the DU may be used in a similar manner to determine the parameter to be used for beamforming operations according to the predefined codebook.

Accordingly, the DU may receive a plurality of measurement results with respect to the radio communication device 1705, and the measurement results may represent the measurements that the radio communication device 1705 performed based on a plurality of reference signals beamformed by each RU 1702, 1703, 1704 using measurement beamforming vectors that the DU provides. The processor of the DU may provide the input including the plurality of measurement results with respect to the reference signals transmitted by a plurality of transmitters (RUs) to the AI/ML to obtain the determined parameter according to any one of the examples provided in this disclosure.

Furthermore, as provided in various examples in this disclosure, the device may receive the measurement results from the another communication device in a radio communication system. In various examples, the another communication device may include a transceiver that is communicatively couplable to the device, a processor, and a measurement circuit to perform the measurements to obtain the measurement results. The another communication device may transmit the measurement results to the device via the transceiver. As indicated, the measurement circuit of the another communication device may measure IQ samples, receive power with respect to the reference signals, RSRP, or RSRQ, and accordingly, the measurement results may include information indicating the measurements. In various examples, the processor of the another communication device may quantize the measured power. The processor may encode a message comprising the measurement results and also information to identify one or more reference signals for the measurement results representing the measurement of.

Figure 18:
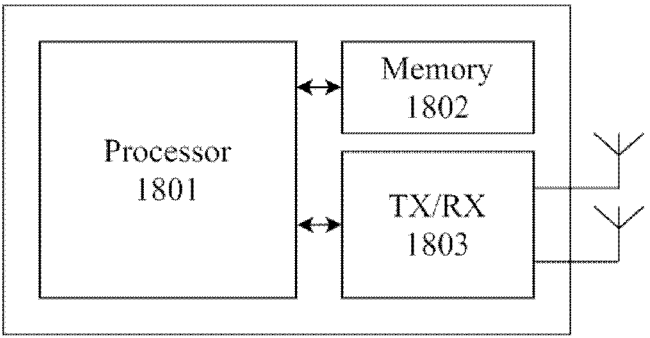
FIG. 18 exemplarily shows another example of the device.

In various examples, the another communication may include the device as provided in this disclosure. FIG. 18 exemplarily shows another example of the device. The device may include any features of the device provided according to FIG. 6. Furthermore, the device may include a measurement circuit (not shown) to perform the measurements to obtain the measurement results. In various examples, the transceiver 1803 may include the measurement circuit, or the measurement circuit may be coupled to the transceiver 1803. The another communication device may transmit the measurement results to the device via the transceiver. As indicated, the measurement circuit of the another communication device may measure IQ samples, receive power with respect to the reference signals, RSRP, or RSRQ, and accordingly, the measurement results may include information indicating the measurements. In various examples, the processor of the another communication device may quantize the measured power.

The device may receive a plurality of reference signals that are beamformed based on measurement beamforming vectors by another communication device. For example, a UE may implement the device, and a BS may implement the another communication device. The measurement circuit of the device may measure the received reference signals and obtain a plurality of measurement results based on the received reference signals. The plurality of measurement results may be stored in the memory 1802 of the device. The processor 1801 may provide the plurality of measurement results to an AI/ML to determine a parameter for a beam management operation according to the predefined codebook as provided in many examples in this disclosure. While the AI/ML on the device may be configured to provide the output including the parameter for the beam management operation, including a predicted transmit beamforming vector of the another communication device, effective beamformed channel gains for the beamforming vectors of the predefined codebook, or effective channel responses with respect to the beamforming vectors of the predefined codebook, the AI/ML may also be configured to select a receive beamforming vector from the predefined codebook in a similar manner. In various examples, the AI/ML may be trained and optimized to provide an optimal receive beamforming vector from the predefined codebook.

In various aspects, the another communication device may beamform the reference signals using beamforming vectors that are fixed, or known by the device, and the AI/ML may be trained to provide the output according to the fixed or known beamforming vectors. As provided according to other examples, the received reference signals may also be beamformed using a measurement codebook or using random beamforming vectors.

The device may further perform measurements based on a measurement codebook including a plurality of receive beamforming vectors. The processor 1801 may determine the receive beamforming vectors in a random manner that is similar to provided in this disclosure with respect to FIG. 6. Similarly, the processor 1801 may be configured to operate in a first operation mode in which the processor obtains the measurement results based on randomly determined receive beamforming vectors, and in a second operation mode in which the processor obtains the measurement results based on a determined measurement codebook including some of the randomly determined receive beamforming vectors in a similar manner. Any of the aspects provided with respect to transmit beamforming vectors according to the previous examples including FIG. 6 may also be performed by the device with respect to the receive beamforming vectors.

Figure 19:
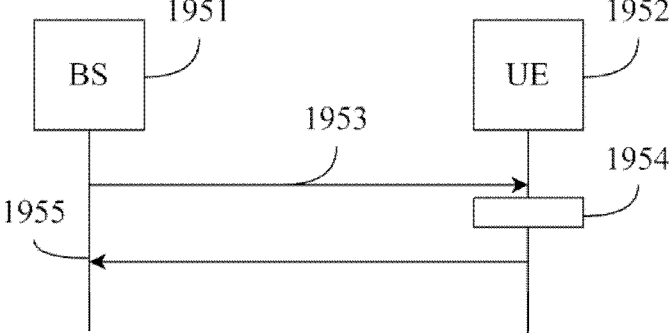
FIG. 19 exemplarily shows an exchange of information between devices.

FIG. 19 exemplarily shows an exchange of information between the devices. A first device including the device is depicted as BS 1951 and a second device including the device is depicted as a UE 1952 communicating according to the 5G NR. In this illustrative example, the BS 1951 may send 1953 a plurality of SS Bursts that the BS 1951 has beamformed one or more SSBs in each SSB Bursts using different measurement beamforming vectors and the UE 1952 may receive the SSBs in the SS Bursts and perform measurements with the received SSBs.

Eventually, the UE 1952 may receive one or more SSBs with a sufficient SNR such that the UE 1952 may acquire synchronization and decode the PBCH data including the DM-RS. The device of the UE 1952 may provide 1954 the measurement results to the AI/ML that is configured to select one or more optimal transmit beamforming vectors from the predefined codebook that the BS 1951 may use. The UE 1952 may encode a message indicating the one or more optimal transmit beamforming vectors from the predefined codebook and transmit 1955 the encoded message to the BS 1951. In various examples, the processor of the UE 1952 may provide the measurement results to the AI/ML that is configured to select an optimal receive beamforming vectors from the SSBs that are beamformed using measurement beamforming vectors.

Figure 20:
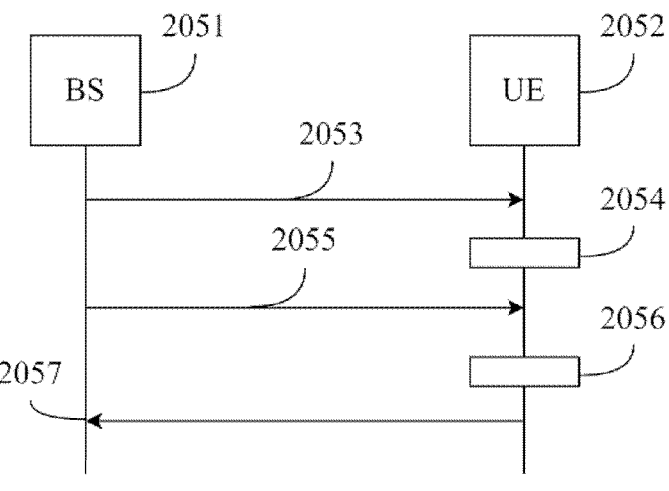
FIG. 20 exemplarily shows an exchange of information between devices.

FIG. 20 exemplarily shows an exchange of information between the devices. A first device including the device is depicted as BS 2051 and a second device including the device is depicted as a UE 2052 communicating according to the 5G NR. In this illustrative example, the memory of the BS 2051 includes the machine learning model parameters that are previously trained, and the AI/ML of the BS 2051 may be configured to provide the output with respect to the input using the machine learning model parameters. Once the UE 2052 connects to the radio communication network, the BS 2051 may encode data including the machine learning model parameters stored in the memory, and transmit 2053 to the UE 2052. The BS 2051 may transmit the encoded data as a CSI-RS decoding token.

The UE 2052 may be configured to implement the AI/ML in a similar manner to the BS 2051. The UE 2052 may receive the machine learning model parameters and store 2054 the received machine learning model parameters in the memory of the UE 2052. The AI/ML of the UE 2052 may be configured to provide the output with respect to the input according to the stored machine learning model parameters received from the BS 2051. In various examples, the UE 2052 may optimize the stored machine learning model parameters according to a predefined algorithm. In a particular example, the AI/ML of the UE 2052 may be configured to determine a standardized feedback message from channel measurements according to the received CSI-RS according to the stored machine learning model parameters. Accordingly, an optimization process at the UE 2052 may be performed more quickly.

Furthermore, the BS 2051 may transmit 2055 CSI-RS to the UE 2052 for beam management operation. The UE 2052 may receive the CSI-RS and provide 2056 the measurement results in response to the received CSI-RS to the AI/ML that is configured to provide the output according to the stored machine learning model parameters. Based on the output of the AI/ML, the UE 2052 may transmit 2057 standardized CSI metrics that may include a PMI, a CQI, or an RI to the BS 2051, and the BS 2051 may configure the radio connection.

Furthermore, the UE 2052 may receive the machine learning model parameters from the BS 2051 in a periodic or in an aperiodic manner in order to optimize the output of the AI/ML model. The UE 2052 may also optimize the stored machine learning model parameters according to the operations of the UE 2052, and the UE 2052 may provide feedback to the BS 2051 for the optimizations, with which the BS 2051 may adjust its own machine learning model parameters.

Figure 21:
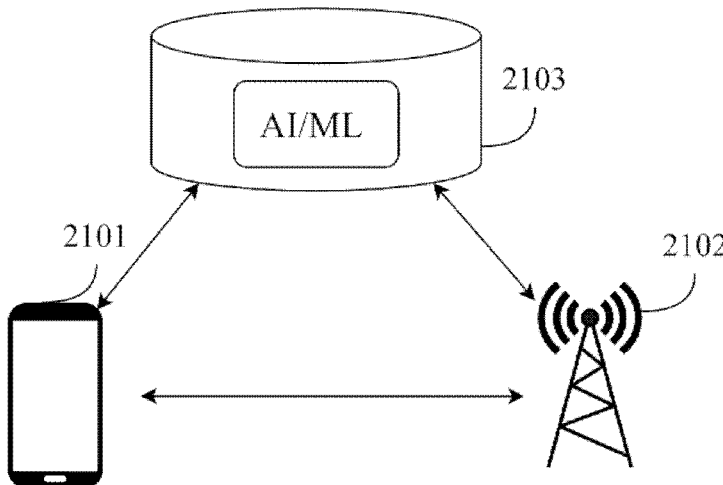
FIG. 21 shows an exemplary illustration of a radio communication system.

FIG. 21 shows an exemplary illustration of a radio communication system. A first TRP 2101 that is depicted as a UE including the device as provided in this disclosure may communicate with a second TRP 2102 that is depicted as a BS including the device as provided in this disclosure. The first TRP 2101 and/or the second TRP 2102 are further communicatively coupled to a computing device (e.g. a cloud computing device) 2103 that implements the AI/ML as provided in this disclosure. Accordingly, the respective processors of the first TRP 2101 and/or the second TRP 2102 may provide the input to the computing device 2103 to obtain the determined parameter for the beam management operation according to the predefined codebook.

FIG. 22 exemplarily shows an example of a method. The method may include transmitting 2201 a plurality of reference signals, each reference signal being beamformed based on a set of beamforming weights that is different from a set of beamforming weights of at least one other reference signal, receiving 2202 a plurality of measurement results representing measurements of another communication device for at least some of the plurality of reference signals, providing 2203 the plurality of measurement results to a machine learning model configured to determine a parameter for a beam management operation using a predefined codebook, performing 2204 the beam management operation according to the predefined codebook based on the determined parameter. In an example, a non-transitory computer-readable medium may include instructions which, if performed by a processor, cause the processor to perform the method.

FIG. 23 exemplarily shows an example of a method. The method may include receiving 2301 a plurality of reference signals using a plurality of beamforming vectors, measuring 2302 received plurality of reference signals to obtain a plurality of measurement results representing measurements for at least some of the received plurality of reference signals, providing 2303 the plurality of measurement results to a machine learning model configured to determine a parameter for a beam management operation using a predefined codebook, performing 2304 the beam management operation according to the predefined codebook based on the determined parameter. In an example, a non-transitory computer-readable medium may include instructions which, if performed by a processor, cause the processor to perform the method.

Figure 24:
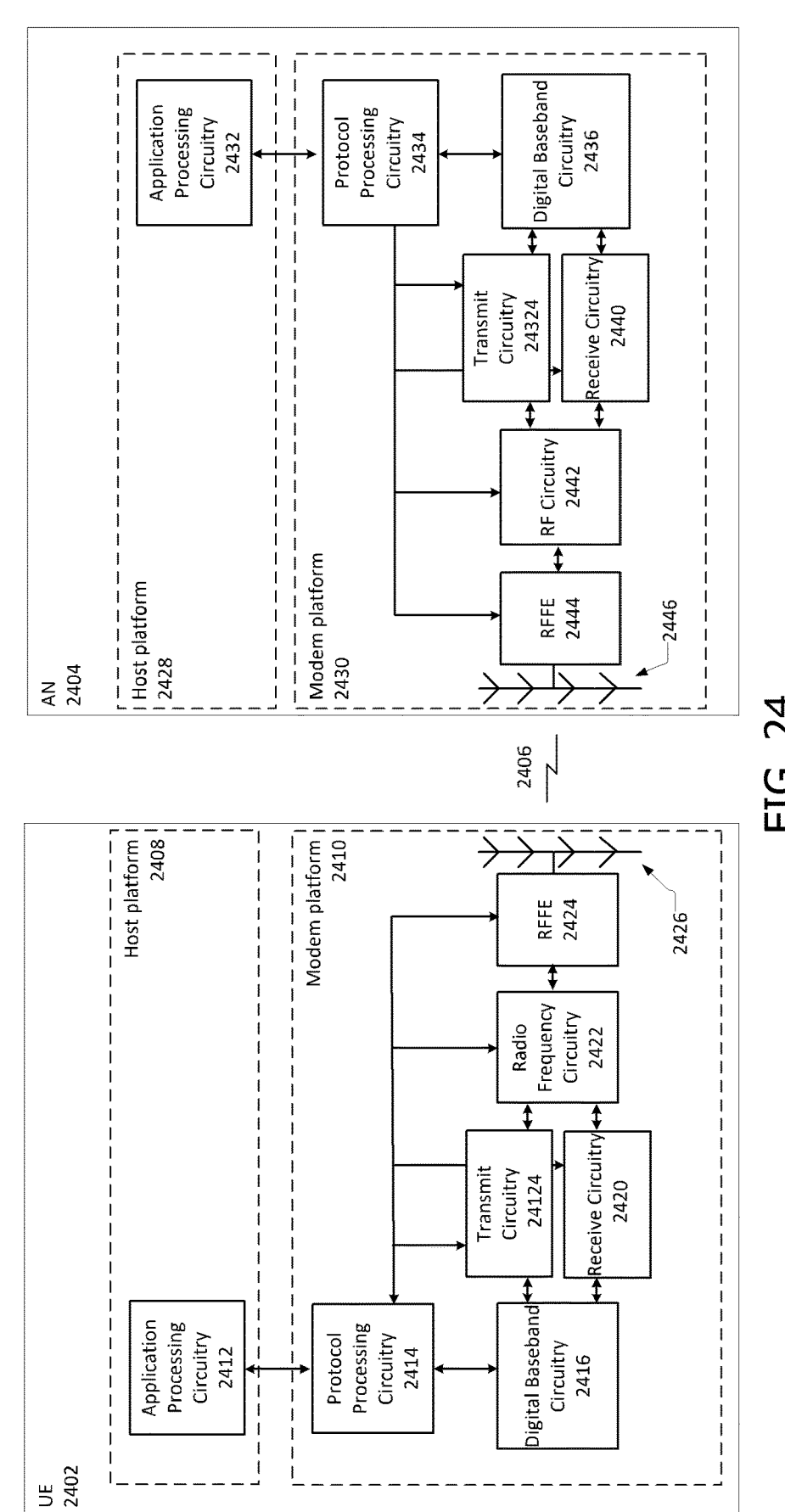
FIG. 24 exemplarily illustrates a wireless network.

FIG. 24 exemplarily illustrates a wireless network 2400 in accordance with various aspects. The wireless network 2400 may include a UE 2402 in wireless communication with an AN 2404. The UE 2402 and AN 2404 may be similar to, and substantially interchangeable with, like-named components described elsewhere herein.

The UE 2402 may be communicatively coupled with the AN 2404 via connection 2406. The connection 806 is illustrated as an air interface to enable communicative coupling, and can be consistent with cellular communications protocols such as an LTE protocol or a 5G NR protocol operating at mmWave or sub-6 GHZ frequencies.

The UE 2402 may include a host platform 2408 coupled with a modem platform 2410. The host platform 2408 may include application processing circuitry 2412, which may be coupled with protocol processing circuitry 2414 of the modem platform 2410. The application processing circuitry 2412 may run various applications for the UE 2402 that source/sink application data. The application processing circuitry 2412 may further implement one or more layer operations to transmit/receive application data to/from a data network. These layer operations may include transport (for example user datagram protocol (UDP)) and Internet (for example, internet protocol (IP)) operations The protocol processing circuitry 2414 may implement one or more of layer operations to facilitate transmission or reception of data over the connection 2406. The layer operations implemented by the protocol processing circuitry 2414 may include, for example, MAC, RLC, PDCP, RRC and NAS operations.

The modem platform 2410 may further include digital baseband circuitry 2416 that may implement one or more layer operations that are "below" layer operations performed by the protocol processing circuitry 2414 in a network protocol stack. These operations may include, for example, physical layer (PHY) operations including one or more of hybrid automatic repeat request (HARQ)-acknowledgment (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 2410 may further include transmit circuitry 2418, receive circuitry 2420, RF circuitry 2422, and RF front end (RFFE) 2424, which may include or connect to one or more antenna panels 2426. Briefly, the transmit circuitry 2418 may include a digital-to-analog converter, mixer, intermediate frequency (IF) components, etc.; the receive circuitry 2420 may include an analog-to-digital converter, mixer, IF components, etc.; the RF circuitry 2422 may include a low-noise amplifier, a power amplifier, power tracking components, etc.; RFFE 2424 may include filters (for example, surface/bulk acoustic wave filters), switches, antenna tuners, beamforming components (for example, phase-array antenna components), etc. The selection and arrangement of the components of the transmit circuitry 2418, receive circuitry 2420, RF circuitry 2422, RFFE 2424, and antenna panels 2426 (referred generically as "transmit/receive components") may be specific to details of a specific implementation such as, for example, whether communication is time division multiplexing (TDM) or frequency division multiplex (FDM), in mmWave or sub-6 gHz frequencies, etc. In some aspects, the transmit/receive components may be arranged in multiple parallel transmit/receive chains, may be disposed in the same or different chips/modules, etc.

In some aspects, the protocol processing circuitry 2414 may include one or more instances of control circuitry (not shown) to provide control functions for the transmit/receive components.

A UE reception may be established by and via the antenna panels 2426, RFFE 2424, RF circuitry 2422, receive circuitry 2420, digital baseband circuitry 2416, and protocol processing circuitry 2414. In some aspects, the antenna panels 2426 may receive a transmission from the AN 2404 by receive-beamforming signals received by a plurality of antennas/antenna elements of the one or more antenna panels 2426.

A UE transmission may be established by and via the protocol processing circuitry 2414, digital baseband circuitry 2416, transmit circuitry 2418, RF circuitry 2422, RFFE 2424, and antenna panels 2426. In some aspects, the transmit components of the UE 2404 may apply a spatial filter to the data to be transmitted to form a transmit beam emitted by the antenna elements of the antenna panels 2426.

Similar to the UE 2402, the AN 2404 may include a host platform 2428 coupled with a modem platform 2430. The host platform 2428 may include application processing circuitry 2432 coupled with protocol processing circuitry 2434 of the modem platform 2430. The modem platform may further include digital baseband circuitry 2436, transmit circuitry 2438, receive circuitry 2440, RF circuitry 2442, RFFE circuitry 2444, and antenna panels 2446. The components of the AN 2404 may be similar to and substantially interchangeable with like-named components of the UE 2402. In addition to performing data transmission/reception as described above, the components of the AN 2408 may perform various logical functions that include, for example, radio network controller (RNC) functions such as radio bearer management, uplink and downlink dynamic radio resource management, and data packet scheduling.

Figure 25:
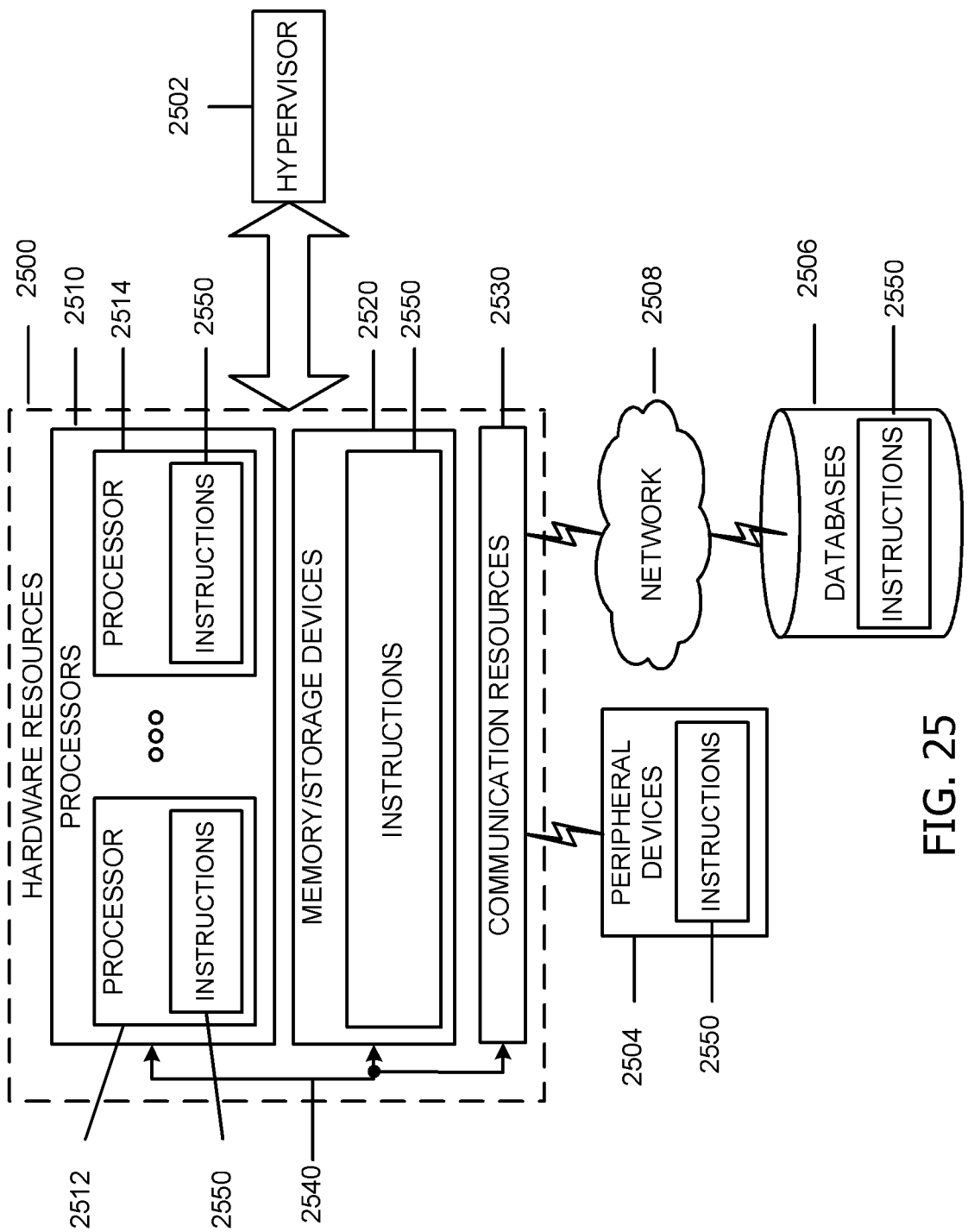
FIG. 25 is an exemplary block diagram illustrating components, according to some example aspects.

FIG. 25 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 25 shows a diagrammatic representation of hardware resources 2500 including one or more processors (or processor cores) 2510, one or more memory/storage devices 2520, and one or more communication resources 2530, each of which may be communicatively coupled via a bus 2540 or other interface circuitry. For aspects where node virtualization (e.g., NFV) is utilized, a hypervisor 2502 may be executed to provide an execution environment for one or more network slices/sub-slices to utilize the hardware resources 2500.

The processors 2510 may include, for example, a processor 2512 and a processor 2514. The processors 2510 may be, for example, a central processing unit (CPU), a reduced instruction set computing (RISC) processor, a complex instruction set computing (CISC) processor, a graphics processing unit (GPU), a digital signal processer (DSP) such as a baseband processor, an application-specific integrated circuit (ASIC), an field-programmable gate array (FPGA), a radio-frequency integrated circuit (RFIC), another processor (including those discussed herein), or any suitable combination thereof.

The memory/storage devices 2520 may include main memory, disk storage, or any suitable combination thereof. The memory/storage devices 2520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2530 may include interconnection or network interface controllers, components, or other suitable devices to communicate with one or more peripheral devices 2504 or one or more databases 2506 or other network elements via a network 2508. For example, the communication resources 2530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 2550 may include software, a program, an application, an applet, an app, or other executable code for causing at least any of the processors 2510 to perform any one or more of the methodologies discussed herein. The instructions 2550 may reside, completely or partially, within at least one of the processors 2510 (e.g., within the processor's cache memory), the memory/storage devices 2520, or any suitable combination thereof. Furthermore, any portion of the instructions 2550 may be transferred to the hardware resources 2500 from any combination of the peripheral devices 2504 or the databases 2506. Accordingly, the memory of processors 2510, the memory/storage devices 2520, the peripheral devices 2504, and the databases 2506 are examples of computer-readable and machine-readable media. In various examples, a non-transitory computer-readable medium including one or more instructions which, if executed by a processor, cause the processor to: access environment information including an indication of an amount of a crowd of road users intersecting with a predetermined route of a vehicle in a road environment, prioritize an anticipated movement of at least one road user of the crowd of road users relative to a predicted movement of the vehicle within the predetermined route based on the amount of the crowd of road users; and determine an action to be taken by the vehicle allowing the anticipated movement of the at least one road user of the crowd of road users. The one or more instructions may further cause the processor to act as provided in this disclosure.

The following examples pertain to further aspects of this disclosure.

Example 1 relates to a subject matter including a radio communication device including: a transceiver configured to: transmit a plurality of reference signals, each reference signal being beamformed based on a set of beamforming weights that is different from a set of beamforming weights of at least one other reference signal; receive a plurality of measurement results representing measurements for at least some of the plurality of reference signals; and a processor configured to: provide the plurality of measurement results to a machine learning model configured to determine a parameter for a beam management operation using a predefined codebook; perform the beam management operation according to the predefined codebook based on the determined parameter.

In example 2, the subject matter of example 1, can optionally include that the processor is further configured to precode the plurality of reference signals according a first codebook, the first codebook being different than the predefined codebook. In example 3, the subject matter of example 1, can optionally include that the plurality of reference signals are beamformed into random directions. In example 4, the subject matter of example 3, can optionally include that the processor is further configured to generate random beamforming vectors; can optionally include that each generated random beamforming vector includes a generated set of beamforming weights to beamform the plurality of reference signals into the random directions. In example 5, the subject matter of example 3 or example 4, can optionally include that the processor is further configured to obtain the first codebook with a random selection from the predefined codebook.

In example 6, the subject matter of example 4, can optionally include that the processor is further configured to operate in a first operation mode generating the random beamforming vectors for the plurality of reference signals and store the generated random beamforming vectors in a memory; can optionally include that the processor is further configured to determine a performance index for each of the generated random beamforming vectors. In example 7, the subject matter of example 6, can optionally include that the processor is further configured to select the generated random beamforming vectors based on the performance index. In example 8, the subject matter of example 6 or example 7, can optionally include that the processor is further configured to operate in a second operation mode precoding the reference signals with the selected random beamforming vectors. In example 9, the subject matter of any one of examples 1 to 8, can optionally include that the transceiver is configured to transmit the plurality of reference signals in a plurality of spectral resources.

In example 10, the subject matter of any one of examples 1 to 9, further includes a memory to store parameters of a target function. In example 11, the subject matter of example 10, can optionally include that the processor is further configured to optimize the target function based on the plurality of measurement results. In example 12, the subject matter of example 11, can optionally include that the processor is further configured to optimize the target function based on at least one of each reference signal, one or more respective measurement results, or each beamforming vector used to transmit the respective reference signals. In example 13, the subject matter of any one of examples 10 to 12, can optionally include that the machine learning model is configured to select a beamforming vector from the predefined codebook based on the plurality of measurement results. In example 14, the subject matter of example 13, can optionally include that the processor is further configured to determine a transmit beamforming vector based on the optimized target function.

In example 15, the subject matter of example 14, can optionally include that the processor is further configured to select the transmit beamforming vector from the predefined codebook based on the optimized target function. In example 16, the subject matter of example 15, can optionally include that the target function includes a first variable Y' representing a reference signal, a second variable z representing a respective measurement result for the reference signal, and a third variable w representing a used transmit beamforming vector for the reference signal. In example 17, the subject matter of any one of examples 14 to 16, can optionally include that the processor is further configured to select the transmit beamforming vector maximizing a calculated power of a radio communication signal to be received by the another radio communication device from the predefined codebook. In example 18, the subject matter of any one of examples 14 to 17, can optionally include that the processor is further configured to calculate a power of a radio communication signal to be received by the another radio communication device for a plurality of beamforming vectors provided by the predefined codebook.

In example 19, the subject matter of any one of examples 14 to 18, can optionally include that the processor is further configured to calculate a power of a radio communication signal to be received by the another radio communication device for each beamforming vector provided by the predefined codebook. In example 20, the subject matter of example 19, can optionally include that the processor is further configured to select the transmit beamforming vector based on the calculated powers of the radio communication signals to be received by the another radio communication device. In example 21, the subject matter of any one of examples 13 to 20, can optionally include that the machine learning model is further configured to provide an output indicating the selected transmit beamforming vector. In example 22, the subject matter of any one of examples 13 to 21, can optionally include that the processor is further configured to apply the selected transmit beamforming vector to transmissions to the another radio communication device.

In example 23, the subject matter of any one of examples 13 to 22, can optionally include that the processor is further configured to generate a channel state information reference signal (CSI-RS) for channel acquisition or a transmission configuration indicator (TCI) with the selected transmit beamforming vector. In example 24, the subject matter of any one of examples 13 to 23, can optionally include that the transceiver is configured to receive the plurality of measurement results from a plurality of other communication devices in response to the transmitted plurality of reference signals. In example 25, the subject matter of example 24, can optionally include that the machine learning model is configured to determine effective beamformed channel gains based on the plurality of measurement results. In example 26, the subject matter of example 24 or example 25, can optionally include that the processor is further configured to determine the effective beamformed channel gains for communication channels between the communication device and the plurality of other communication devices based on the plurality of measurement results.

In example 27, the subject matter of example 26, can optionally include that the processor is further configured to determine the effective beamformed channel gains based on the optimized target function. In example 28, the subject matter of example 27, can optionally include that the optimized target function is configured to provide an estimation of the effective beamformed channel gains for each of the communication channels. In example 29, the subject matter of example 28, can optionally include that the processor is further configured to calculate the effective beamformed channel gains for each of the communication channels for a plurality of beamforming vectors provided by the predefined codebook. In example 30, the subject matter of example 29, can optionally include that the processor is further configured to calculate the effective beamformed channel gains for each of the communication channels for each beamforming vector provided by the predefined codebook.

In example 31, the subject matter of any one of examples 25 to 30, can optionally include that the processor is further configured to determine a signal to interference and noise ratio (SINR) for transmissions to at least one of the plurality of other communication devices; can optionally include that the processor is further configured to schedule the transmissions to the at least one of the plurality of other communication devices based on the determined SINR. In example 32, the subject matter of any one of examples 13 to 31, can optionally include that the machine learning model is configured to determine effective channel responses based on the plurality of measurement results. In example 33, the subject matter of example 32, can optionally include that the processor is further configured to determine each effective channel response based on the optimized target function. In example 34, the subject matter of example 33, can optionally include that the optimized target function is configured to estimate the effective channel response for the communication channels.

In example 35, the subject matter of any one of examples 32 to 34, can optionally include that the processor is further configured to calculate the effective channel response for each of the communication channels for a plurality of beamforming vectors provided by the predefined codebook. In example 36, the subject matter of example 35, can optionally include that the processor is further configured to calculate the effective channel response for each of the communication channels for each beamforming vector provided by the predefined codebook. In example 37, the subject matter of any one of examples 32 to 36, can optionally include that the processor is further configured to determine parameters for spatial multiplexing based on the estimated effective channel response. In example 38, the subject matter of any one of examples 24 to 37, can optionally include that the transceiver is configured to transmit the plurality of reference signals to a plurality of remote radio units communicatively coupled to the plurality of other communication devices. In example 39, the subject matter of any one of examples 24 to 38, can optionally include that the processor is further configured to match one or more of the transmitted reference signals and one of the plurality of measurement results.

In example 40, the subject matter of any one of examples 24 to 39, can optionally include that the transceiver is configured to receive information may include an identifier to identify the one or more of the transmitted reference signals corresponding to one of the plurality of measurement results. In example 41, the subject matter of any one of examples 1 to 40, can optionally include that the plurality of reference signals includes synchronization signal blocks (SSBs) or channel state information reference signals (CSI-RSs). In example 42, the subject matter of any one of examples 1 to 41, further may include a memory configured to store machine learning model parameters; can optionally include that the machine learning model is further configured to provide the output in response to the input of the plurality of measurement results based on the stored machine learning model parameters. In example 43, the subject matter of example 42, can optionally include that the processor is further configured to encode the stored machine learning model parameters for transmission to a communicatively coupled communication device.

In example 44, the subject matter of example 42 or example 43, can optionally include that the machine learning model is trained with a supervised training. In example 45, the subject matter of any one of examples 1 to 44, can optionally include that the machine learning model includes: an execution module configured to receive the plurality of measurement results and provide an output determining the parameter for the beam management operation; and a training module may include a neural network to train the execution block. In example 46, the subject matter of example 45, can optionally include that the neural network includes a layer may include a plurality of nodes, each node is configured to provide an output based on an input with a linear activation function; can optionally include that the linear activation function includes a weight coefficient vector v multiplying the input, and a bias parameter b; can optionally include that the input includes a matrix representing a channel response.

In example 47, the subject matter of example 46, can optionally include that the neural network is configured to receive training data may include information representing a plurality of channel responses and noises; can optionally include that the neural network is configured to provide the output to the execution module; can optionally include that the machine learning model is further configured to adjust the linear activation function based on the parameter determined by the execution module. In example 48, the subject matter of example 47, can optionally include that the execution module is configured to receive M number of measurement results; can optionally include that the neural network includes M number of nodes; can optionally include that the processor is further configured to generate the plurality of reference signals based on the weight coefficient vectors. In example 49, the subject matter of example 48, can optionally include that the neural network includes a fully connected neural network.

In example 50, the subject matter of example 45, can optionally include that the training module is configured to train the machine learning module according to a reinforcement model; can optionally include that the training module includes a reinforcement model agent (RL agent) configured to determine an action based on one or more measurement results; can optionally include that the reinforcement model is further configured to generate a reward based on an achieved data rate according to the determined parameter for the beam management operation. In example 51, the subject matter of any one of examples 45 to 50, can optionally include that the machine learning model is further configured to be trained with a predetermined period. In example 52, the subject matter of any one of examples 1 to 51, can optionally include that the machine learning model includes at least one of a neural network, a convolutional neural network, or a recurrent neural network.

In example 53, a radio communication system may include: a first communication device according to any one of examples 1 to 52; a second communication device may include: a transceiver communicatively coupled to the first communication device; a measurement circuit configured to measure received reference signals. In example 54, The subject matter of example 53, can optionally include that the second communication device includes a processor configured to encode information representing measurements of one or more received reference signals for a transmission to the first communication device. In example 55, The subject matter of example 53 or example 54, can optionally include that the measurement circuit is configured to provide an output representing the one or more received reference signals. In example 56, The subject matter of example 54 or example 55, can optionally include that the measurement circuit is configured to measure power of the one or more received reference signals.

In example 57, The subject matter of example 56, can optionally include that the measured power includes a reference signal received power (RSRP). In example 58, The subject matter of example 57, can optionally include that the processor of the second communication device is configured to quantize the measured power. In example 59, The subject matter of example 56, can optionally include that the processor is further configured to encode a message may include information to identify the one or more reference signals for the measurement result representing the measurements with the one or more reference signals. In example 60, The subject matter of any one of examples 53 to 59, can optionally include that the second communication device includes a memory; can optionally include that the transceiver of the second communication device is configured to receive a plurality of machine learning model parameters from the first communication device and store the machine learning model parameters to the memory; can optionally include that the processor of the second communication device is configured to determine a parameter for a beam management operation based on a machine learning model according to the stored machine learning model parameters; can optionally include that the parameters include one of a beamforming vector, an estimated effective channel gain, or an effective channel response, for a communication with the first communication device based on the predefined codebook.

In example 61, The subject matter of example 60, can optionally include that the processor of the second communication device is configured to encode a message based on the determined parameter. In example 62, The subject matter of example 61, can optionally include that the encoded message includes at least one of a precoding matrix indicator (PMI), a channel quality indicator (CQI), a rank indicator (RI), or a layer indicator (LI). In example 63, The subject matter of any one of examples 53 to 62, can optionally include that a base station includes the first communication device and a user equipment includes the second communication device. In example 64, The subject matter of any one of examples 53 to 63, can optionally include that each of the plurality of measurement results includes information representing a radio communication signal received by the another radio communication device in response to a transmitted reference signal.

In example 65, The subject matter of any one of examples 53 to 63, can optionally include that each of the plurality of measurement results includes information indicating a signal power for the radio communication signal received by the another radio communication device in response to a transmitted reference signal. In example 66, The subject matter of example 65, can optionally include that the processor is further configured to quantize the plurality of measurement results. In example 67, The subject matter of any one of examples 53 to 63, can optionally include that each of the plurality of measurement results includes information indicating a signal characteristic of a received radio communication signal by the another radio communication device in response to a transmitted reference signal. In example 68, A method may include: transmitting a plurality of reference signals, each reference signal being beamformed based on a set of beamforming weights that is different from a set of beamforming weights of at least one other reference signal; receiving a plurality of measurement results representing measurements of another communication device for at least some of the plurality of reference signals; providing the plurality of measurement results to a machine learning model configured to determine a parameter for a beam management operation using a predefined codebook; performing the beam management operation according to the predefined codebook based on the determined parameter.

In example 69, A non-transitory computer-readable medium may include one or more instructions which, if executed by a processor, cause the processor to: encode a plurality of reference signals, each reference signal being beamformed based on a set of beamforming weights that is different from a set of beamforming weights of at least one other reference signal; decode information indicating a plurality of measurement results representing measurements of another communication device for at least some of the plurality of reference signals; provide the plurality of measurement results to a machine learning model configured to determine a parameter for a beam management operation using a predefined codebook; perform the beam management operation according to the predefined codebook based on the determined parameter. In example 70, A radio communication device may include: a memory to store a plurality of measurement results representing measurements of a plurality of reference signals beamformed based on a plurality of sets of beamforming weights by another radio communication device and received machine learning model parameters; a processor configured to: provide the plurality of measurement results to a machine learning model configured to determine a parameter for a beam management operation using a predefined codebook based on the received machine learning model parameters; perform the beam management operation according to the predefined codebook based on the determined parameter to communicate with the another radio communication device.

In example 71, the subject matter of example 70, further may include: a transceiver configured to receive information indicating machine learning model parameters from the another communication device; can optionally include that the processor is configured to store the received information as the received machine learning model parameters in the memory. In example 72, the subject matter of example 70 or example 71, can optionally include that the processor is further configured to: decode a channel state information reference signal (CSI-RS); perform a beam management operation according to the predefined codebook based on the determined parameter; encode a message may include at least one of a precoding matrix indicator (PMI), a channel quality indicator (CQI), a rank indicator (RI), or a layer indicator (LI) in response to the received CSI-RS.

In example 73, a method may include: storing a plurality of measurement results representing measurements of a plurality of reference signals beamformed based on a plurality of sets of beamforming weights by another radio communication device and received machine learning model parameters; providing the plurality of measurement results to a machine learning model configured to determine a parameter for a beam management operation using a predefined codebook based on the received machine learning model parameters; performing the beam management operation according to the predefined codebook based on the determined parameter to communicate with the another radio communication device.

In example 74, a non-transitory computer-readable medium may include one or more instructions which, if executed by a processor, cause the processor to: store a plurality of measurement results representing measurements of a plurality of reference signals beamformed based on a plurality of sets of beamforming weights by another radio communication device and received machine learning model parameters; provide the plurality of measurement results to a machine learning model configured to determine a parameter for a beam management operation using a predefined codebook based on the received machine learning model parameters; perform the beam management operation according to the predefined codebook based on the determined parameter to communicate with the another radio communication device.

In example 75, a radio communication device may include: a transceiver configured to receive a plurality of reference signals using a plurality of beamforming vectors; a measurement circuit configured to measure received plurality of reference signals to obtain a plurality of measurement results representing measurements for at least some of the received plurality of reference signals; and a processor configured to: provide the plurality of measurement results to a machine learning model configured to determine a parameter for a beam management operation using a predefined codebook; perform the beam management operation according to the predefined codebook based on the determined parameter.

In example 76, the subject matter of example 75, can optionally include that the plurality of beamforming vectors are selected from a first codebook, the first codebook being different than the predefined codebook. In example 77, the subject matter of example 76, can optionally include that the plurality of beamforming vectors includes randomly generated receive beamforming vectors. In example 78, the subject matter of example 77, can optionally include that the processor is further configured to obtain the first codebook with a random selection from the predefined codebook. In example 79, the subject matter of example 77 or example 78, can optionally include that the processor is further configured to operate in a first operation mode generating the random beamforming vectors to receive the plurality of reference signals and store the generated random beamforming vectors in a memory; can optionally include that the processor is further configured to determine a performance index for each of the generated random beamforming vectors.

In example 80, the subject matter of example 79, can optionally include that the processor is further configured to select the generated random beamforming vectors based on the performance index. In example 81, the subject matter of example 80, can optionally include that the processor is further configured to operate in a second operation mode receiving the reference signals using the selected random beamforming vectors. In example 82, the subject matter of any one of examples 75 to 81, can optionally include that the transceiver is configured to receive the plurality of reference signals in a plurality of spectral resources. In example 83, the subject matter of any one of examples 75 to 82, further includes a memory to store parameters of a target function. In example 84, the subject matter of example 83, can optionally include that the processor is further configured to optimize the target function based on the plurality of measurement results. In example 85, the subject matter of example 84, can optionally include that the processor is further configured to optimize the target function based on one or more predefined beamforming vectors used to transmit the reference signals, one or more respective measurement results, and each beamforming vector used to receive the respective reference signals.

In example 86, the subject matter of any one of examples 83 to 85, can optionally include that the machine learning model is configured to select a receive beamforming vector from the predefined codebook based on the plurality of measurement results. In example 87, the subject matter of example 86, can optionally include that the processor is further configured to determine the receive beamforming vector based on the optimized target function. In example 88, the subject matter of example 86 or example 87, can optionally include that the processor is further configured to select the receive beamforming vector from the predefined codebook based on the optimized target function. In example 89, the subject matter of example 88, can optionally include that the target function includes a first variable Y representing a predefined reference signal, a second variable z representing a respective measurement result for the predefined reference signal, and a third variable w representing a used receive beamforming vector for the reference signal.

In example 90, the subject matter of any one of examples 86 to 89, can optionally include that the processor is further configured to select the receive beamforming vector maximizing a calculated power of a radio communication signal to be received from another radio communication device from the predefined codebook. In example 91, the subject matter of any one of examples 86 to 89, can optionally include that the processor is further configured to calculate a power of a radio communication signal to be received for a plurality of beamforming vectors provided by the predefined codebook. In example 92, the subject matter of any one of examples 86 to 89, can optionally include that the processor is further configured to calculate a power of a radio communication signal to be received for each beamforming vector provided by the predefined codebook.

In example 93, the subject matter of example 91 or example 92, can optionally include that the processor is further configured to select the receive beamforming vector based on the calculated powers of the radio communication signals to be received. In example 94, the subject matter of any one of examples 86 to 93, can optionally include that the machine learning model is further configured to provide an output indicating the selected receive beamforming vector. In example 95, the subject matter of any one of examples 86 to 94, can optionally include that the processor is further configured to apply the selected receive beamforming vector to receive radio communication signals from the another radio communication device.

In example 96, the subject matter of any one of examples 86 to 95, can optionally include that the transceiver is configured to receive the plurality of reference signals from a plurality of other communication devices, can optionally include that each of the plurality of reference signals are beamformed based on a predefined set of beamforming weights. In example 97, the subject matter of any one of examples 86 to 96, can optionally include that the machine learning model is configured to determine effective beamformed channel gains based on the plurality of measurement results. In example 98, the subject matter of example 97, can optionally include that the processor is further configured to determine the effective beamformed channel gains for communication channels between the communication device and the plurality of other communication devices based on the plurality of measurement results. In example 99, the subject matter of example 98, can optionally include that the processor is further configured to determine the effective beamformed channel gains based on the optimized target function. In example 100, the subject matter of example 99, can optionally include that the optimized target function is configured to provide an estimation of the effective beamformed channel gains for each of the communication channels.

In example 101, the subject matter of example 100, can optionally include that the processor is further configured to calculate the effective beamformed channel gains for each of the communication channels for a plurality of beamforming vectors provided by the predefined codebook. In example 102, the subject matter of example 101, can optionally include that the processor is further configured to calculate the effective beamformed channel gains for each of the communication channels for each beamforming vector provided by the predefined codebook. In example 103, the subject matter of any one of examples 97 to 102, can optionally include that the processor is further configured to determine a signal to interference and noise ratio (SINR) for at least one of the plurality of other communication devices; can optionally include that the processor is further configured to schedule the transmissions to the at least one of the plurality of other communication devices based on the determined SINR.

In example 104, the subject matter of any one of examples 86 to 103, can optionally include that the machine learning model is configured to determine effective channel responses based on the plurality of measurement results. In example 105, the subject matter of example 104, can optionally include that the processor is further configured to determine effective channel responses based on the optimized target function. In example 106 the subject matter of example 105, can optionally include that the optimized target function is configured to estimate the effective channel response for the communication channels. In example 107, the subject matter of example 106, can optionally include that the processor is further configured to calculate the effective channel response for each of the communication channels for a plurality of beamforming vectors provided by the predefined codebook. In example 108, the subject matter of example 107, can optionally include that the processor is further configured to calculate the effective channel response for each of the communication channels for each beamforming vector provided by the predefined codebook.

In example 109, the subject matter of any one of examples 104 to 108, can optionally include that the processor is further configured to determine parameters for spatial multiplexing based on the estimated effective channel response. In example 110, the subject matter of any one of examples 75 to 109, can optionally include that the transceiver is configured to receive information may include an identifier to identify the one or more of the received reference signals. In example 111, the subject matter of any one of examples 75 to 110, can optionally include that the plurality of reference signals includes synchronization signal blocks (SSBs) or channel state information reference signals (CSI-RSs). In example 112, the subject matter of any one of examples 75 to 111, can optionally include that the plurality of reference signals includes the synchronization signal blocks (SSBs) of an SSB burst may include a plurality of SSBs; and can optionally include that the processor is further configured to decode a physical broadcast control channel (PBCH) of one of the SSBs in the SSB burst using the selected receive beamforming vector.

In example 113, the subject matter of any one of examples 75 to 112, can optionally include that the PBCH includes a demodulation reference signal (DMRS); can optionally include that the processor is further configured to encode a message indicating beamforming parameters for the another radio communication device that transmitted the SSB burst. In example 114, the subject matter of any one of examples 75 to 113, further may include a memory configured to store machine learning model parameters; can optionally include that the machine learning model is further configured to provide the output in response to the input of the plurality of measurement results based on the stored machine learning model parameters. In example 115, the subject matter of example 114, can optionally include that the processor is further configured to encode the stored machine learning model parameters for transmission to a communicatively coupled communication device. In example 116, the subject matter of any one of examples 75 to 115, can optionally include that the machine learning model is trained with a supervised training.

In example 117, the subject matter of any one of examples 75 to 116, can optionally include that the machine learning model includes: an execution module configured to receive the plurality of measurement results and provide an output determining the parameter for the beam management operation; and a training module may include a neural network to train the execution block. In example 118, the subject matter of example 117, can optionally include that the neural network includes a layer may include a plurality of nodes, each node is configured to provide an output based on an input with a linear activation function; can optionally include that the linear activation function includes a weight coefficient vector w multiplying the input, and a bias parameter b; can optionally include that the input includes a matrix representing a channel response. In example 119, the subject matter of example 118, can optionally include that the neural network is configured to receive training data may include information representing a plurality of channel responses and noises; can optionally include that the neural network is configured to provide the output to the execution module; can optionally include that the machine learning model is further configured to adjust the linear activation function based on the parameter determined by the execution module.

In example 120, the subject matter of example 119, can optionally include that the neural network includes a fully connected neural network. In example 121, the subject matter of example 117, can optionally include that the training module is configured to train the machine learning module according to a reinforcement model; can optionally include that the training module includes a reinforcement model agent (RL agent) configured to determine an action based on one or more measurement results; can optionally include that the reinforcement model is further configured to generate a reward based on an achieved data rate according to the determined parameter for the beam management operation. In example 122, the subject matter of any one of examples 117 to 121, can optionally include that the machine learning model is further configured to be trained with a predetermined period. In example 123, the subject matter of any one of examples 75 to 122, can optionally include that the machine learning model includes at least one of a neural network, a convolutional neural network, or a recurrent neural network.

In example 124, the subject matter of any one of examples 75 to 123, can optionally include that the measurement circuit is configured to provide an output representing the one or more received reference signals. In example 125, the subject matter of any one of examples 75 to 124, can optionally include that the measurement circuit is configured to measure power of the one or more received reference signals. In example 126, the subject matter of example 125, can optionally include that the measured power includes a reference signal received power. In example 127, the subject matter of example 126, can optionally include that the plurality of measurement results are quantized. In example 128, the subject matter of any one of examples 75 to 124, can optionally include that the transceiver of the communication device is configured to receive a plurality of machine learning model parameters and store the machine learning model parameters to the memory; can optionally include that the processor of the second communication device is configured to determine the parameter for the beam management operation according to the stored machine learning model parameters.

In example 129, the subject matter of any one of examples 75 to 128, can optionally include that the processor is further configured to decode a channel state information reference signal (CSI-RS); perform a beam management operation according to the predefined codebook based on the determined parameter; encode a message may include at least one of a precoding matrix indicator (PMI), a channel quality indicator (CQI), a rank indicator (RI), or a layer indicator (LI) in response to the received CSI-RS. In example 130, the subject matter of any one of examples 75 to 129, can optionally include that the radio communication device is a user equipment (UE).

In example 131, a method may include: receiving a plurality of reference signals using a plurality of beamforming vectors; measuring received plurality of reference signals to obtain a plurality of measurement results representing measurements for at least some of the received plurality of reference signals; providing the plurality of measurement results to a machine learning model configured to determine a parameter for a beam management operation using a predefined codebook; performing the beam management operation according to the predefined codebook based on the determined parameter.

In example 132, a non-transitory computer-readable medium may include one or more instructions which, if executed by a processor, cause the processor to: decode a plurality of reference signals using a plurality of beamforming vectors; measure received plurality of reference signals to obtain a plurality of measurement results representing measurements for the received plurality of reference signals; provide the plurality of measurement results to a machine learning model configured to determine a parameter for a beam management operation using a predefined codebook; perform the beam management operation according to the predefined codebook based on the determined parameter.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, WiMax, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHZ, and/or 6-7 GHz. However, other aspects may be implemented utilizing any other suitable wireless communication frequency bands, for example, an Extremely High Frequency (EHF) band (the millimeter wave (mm Wave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A radio communication device comprising:
 a transceiver configured to:
  transmit a plurality of reference signals, each reference signal being beamformed based on a set of beamforming weights that is different from a set of beamforming weights of at least one other reference signal; and
  receive a plurality of measurement results representing measurements for at least some of the plurality of reference signals, wherein the plurality of measurement results are received over a plurality of communication channels from a plurality of other communication devices in response to the plurality of reference signals; and a processor configured to:
  provide the plurality of measurement results to a machine learning model configured to:
   determine a parameter for a beam management operation using a predefined codebook; and
   determine an effective channel response for each of the plurality of communication channels for a plurality of beamforming vectors provided by the predefined codebook, wherein the effective channel responses are based on the plurality of measurement results;
  perform the beam management operation according to the predefined codebook based on the parameter; and
  determine parameters for spatial multiplexing based on the effective channel responses.

2. The radio communication device of claim 1, wherein the processor is further configured to precode the plurality of reference signals according a first codebook, the first codebook being different than the predefined codebook.

3. The radio communication device of claim 1, wherein the plurality of reference signals are beamformed into random directions as random beamforming vectors.

4. The radio communication device of claim 3,
 wherein the processor is further configured to operate in a first operation mode generating the random beamforming vectors for the plurality of reference signals and store the random beamforming vectors in a memory,
 wherein the processor is further configured to determine a performance index for each of the random beamforming vectors,
 wherein the processor is further configured to select the random beamforming vectors based on the performance index,
 wherein the processor is further configured to operate in a second operation mode precoding the reference signals with the random beamforming vectors.

5. The radio communication device of claim 1,
 wherein the machine learning model is configured to select a transmit beamforming vector from the predefined codebook based on the plurality of measurement results,
 wherein the machine learning model is further configured to provide an output indicating the transmit beamforming vector,
 wherein the processor is further configured to apply the transmit beamforming vector to transmissions to the plurality of other communication devices.

6. The radio communication device of claim 5, wherein the processor is further configured to generate a channel state information reference signal (CSI-RS) for channel acquisition or a transmission configuration indicator (TCI) with the transmit beamforming vector.

7. The radio communication device of claim 1,
 wherein the machine learning model is configured to determine effective beamformed channel gains based on the plurality of measurement results,
 wherein the processor is further configured to determine the effective beamformed channel gains for the plurality of communication channels between the radio communication device and the plurality of other communication devices based on the plurality of measurement results.

8. The radio communication device of claim 1, wherein the plurality of reference signals comprises synchronization signal blocks (SSBs) or channel state information reference signals (CSI-RSs).

9. The radio communication device of claim 1, the radio communication device further comprising a memory configured to store machine learning model parameters, wherein the machine learning model is further configured to provide an output in response to an input of the plurality of measurement results based on the machine learning model parameters, wherein the machine learning model comprises:

an execution module configured to receive the plurality of measurement results and provide the output determining the parameter for the beam management operation; and a training module comprising a neural network to train the execution module.

10. The radio communication device of claim 9, wherein the neural network comprises a layer comprising a plurality of nodes, each node is configured to provide an output based on an input with a linear activation function, wherein the linear activation function comprises a weight coefficient vector v multiplying the input, and a bias parameter b, wherein the input comprises a matrix representing a channel response, wherein the neural network is configured to receive training data comprising information representing a plurality of channel responses and noises, wherein the neural network is configured to provide the output to the execution module, wherein the machine learning model is further configured to adjust the linear activation function based on the parameter determined by the execution module, wherein the execution module is configured to receive M number of measurement results, wherein the neural network comprises M number of nodes, wherein the processor is further configured to generate the plurality of reference signals based on the weight coefficient vector.

11. The radio communication device of claim 9, wherein the training module is configured to train the machine learning model according to a reinforcement model, wherein the training module comprises a reinforcement model agent (RL agent) configured to determine an action based on one or more measurement results, wherein the reinforcement model is further configured to generate a reward based on an achieved data rate according to the parameter for the beam management operation.

12. A radio communication system comprising:

a first communication device comprising a transceiver configured to:

transmit a plurality of reference signals, each reference signal being beamformed into a random direction as a random beamforming vector based on a set of beamforming weights that is different from a set of beamforming weights of at least one other reference signal; and receive a plurality of measurement results representing measurements for at least some of the plurality of reference signals;

a processor configured to:

provide the plurality of measurement results to a machine learning model configured to determine a parameter for a beam management operation using a predefined codebook;

perform the beam management operation according to the predefined codebook based on the parameter;

operate in a first operation mode and a second operation mode, wherein in the first operation mode the processor is configured to:

generate the random beamforming vectors;

store the random beamforming vectors in a memory;

determine an associated performance index for each of the random beamforming vectors; and select the random beamforming vector based on its associated performance index, wherein in the second operation mode the processor is configured to precode the reference signals with random beamforming vectors; and a second communication device comprising:

a transceiver communicatively coupled to the first communication device; and a measurement circuit configured to measure received reference signals.

13. The radio communication system of claim 12, wherein the second communication device comprises a memory, wherein the transceiver of the second communication device is configured to receive a plurality of machine learning model parameters from the first communication device and store the machine learning model parameters to the memory, wherein the processor of the second communication device is configured to determine a parameter for a beam management operation based on a machine learning model according to the machine learning model parameters, wherein the parameters include one of a beamforming vector, an estimated effective channel gain, or an effective channel response, for a communication with the first communication device based on the predefined codebook.

14. A radio communication device comprising:

a transceiver configured to receive over a plurality of communication channels from a plurality of other communication devices a plurality of reference signals using a plurality of beamforming vectors;

a measurement circuit configured to measure the plurality of reference signals to obtain a plurality of measurement results representing measurements for at least some of the plurality of reference signals; and a processor configured to:

provide the plurality of measurement results to a machine learning model configured to:

determine a parameter for a beam management operation using a predefined codebook; and determine an effective channel response for each of the plurality of communication channels for a plurality of beamforming vectors provided by the predefined codebook, wherein the effective channel responses are based on the plurality of measurement results;

perform the beam management operation according to the predefined codebook based on the parameter; and determine parameters for spatial multiplexing based on the effective channel responses.

15. The radio communication device of claim 14, wherein the plurality of beamforming vectors are selected from a first codebook, the first codebook being different than the predefined codebook.

16. The radio communication device of claim 15, wherein the plurality of beamforming vectors comprises a plurality of randomly generated receive beamforming vectors, wherein the processor is further configured to operate in a second operation mode receiving the reference signals using the plurality of randomly generated beamforming vectors.

17. The radio communication device of claim 14, wherein the machine learning model is configured to select a receive beamforming vector from the predefined codebook based on the plurality of measurement results.

\* \* \* \* \*